(12) United States Patent
Saji

(10) Patent No.: US 9,776,259 B2
(45) Date of Patent: Oct. 3, 2017

(54) CUTTING INSERT AND INDEXABLE CUTTING TOOL

(71) Applicant: TUNGALOY CORPORATION, Iwaki-shi, Fukushima (JP)

(72) Inventor: Ryuichi Saji, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 154 days.

(21) Appl. No.: 14/777,309

(22) PCT Filed: Mar. 18, 2014

(86) PCT No.: PCT/JP2014/057414
§ 371 (c)(1),
(2) Date: Sep. 15, 2015

(87) PCT Pub. No.: WO2014/148515
PCT Pub. Date: Sep. 25, 2014

(65) Prior Publication Data
US 2016/0023285 A1    Jan. 28, 2016

(30) Foreign Application Priority Data
Mar. 19, 2013    (JP) .................................. 2013-056187

(51) Int. Cl.
B23C 5/20        (2006.01)
B23C 5/22        (2006.01)
B23C 5/10        (2006.01)

(52) U.S. Cl.
CPC .............. B23C 5/207 (2013.01); B23C 5/109 (2013.01); B23C 5/2221 (2013.01);
(Continued)

(58) Field of Classification Search
CPC .......... B23B 2200/0423; B23B 27/145; B23B 27/1611; B23C 2200/0416;
(Continued)

(56) References Cited

U.S. PATENT DOCUMENTS 6,929,428 B1    8/2005   Wermeister et al.
2007/0071560 A1*  3/2007   Karonen ................. B23B 27/16
                                                        407/34
(Continued)

FOREIGN PATENT DOCUMENTS

WO    WO 2011/122676 A1    10/2011

OTHER PUBLICATIONS

IDS reference WO 2011/122676 Machine Translation, pp. 1-9, Apr. 10, 2017.*
(Continued)

Primary Examiner — Daniel Howell
Assistant Examiner — Nicole N Ramos
(74) Attorney, Agent, or Firm — Womble Carlyle

(57) ABSTRACT

A cutting insert includes: two opposite end surfaces; a peripheral side surface extending between the end surfaces; and plural cutting edge sections that are formed along an intersecting ridgeline portion between the peripheral side surface and each of the end surfaces. Each of the cutting edge sections includes a corner cutting edge, a major cutting edge, and a minor cutting edge. A non-cutting intersecting ridgeline area extending between adjacent cutting edge sections on one end surface is located adjacent, via the peripheral side surface, to at least a part of the corner cutting edge and the major cutting edge of an associating cutting edge section on the other end surface.

10 Claims, 41 Drawing Sheets

(52) U.S. Cl.
CPC ............... *B23C 2200/0494* (2013.01); *B23C 2200/081* (2013.01); *B23C 2210/045* (2013.01); *B23C 2210/0442* (2013.01); *B23C 2210/0457* (2013.01); *B23C 2210/168* (2013.01)

(58) Field of Classification Search
CPC ...... B23C 2200/0494; B23C 2200/085; B23C 2200/125; B23C 2200/128; B23C 2200/081; B23C 2210/045; B23C 2210/0457; B23C 2210/168; B23C 2210/50; B23C 2210/0442; B23C 5/109; B23C 5/202; B23C 5/205; B23C 5/207; B23C 5/22; B23C 5/2221; Y10T 407/1924; Y10T 407/1934; Y10T 407/235; Y10T 407/24; Y10T 407/1936; Y10T 407/2274; Y10T 407/23; Y10T 407/245

USPC ................ 407/42, 48, 47, 49, 403, 113, 116
See application file for complete search history.

(56) References Cited

U.S. PATENT DOCUMENTS

| 2011/0170963 A1* | 7/2011 | Smilovici ................ B23C 5/06 407/42 |
| 2012/0009029 A1 | 1/2012 | Saji |
| 2012/0170986 A1 | 7/2012 | Nam et al. |

OTHER PUBLICATIONS

International Search Report dated Jun. 17, 2014 issued in PCT counterpart application (No. PCT/JP2014/057414).
International Preliminary Report on Patentability (IPRP) dated Sep. 22, 2015 issued in PCT counterpart application (No. PCT/JP2014/057414) *with translation.*

* cited by examiner

CUTTING INSERT AND INDEXABLE CUTTING TOOL

RELATED APPLICATIONS

This is a 371 US National Phase of International Patent Application No. PCT/JP2014/057414 filed Mar. 18, 2014, and published as WO 2014/148515 on Sep. 25, 2014, which claims priority to JP 2013-056187, filed Mar. 19, 2013. The contents of the aforementioned applications are incorporated by reference in their entirety.

TECHNICAL FIELD

The present invention relates to a cutting insert and an indexable cutting tool that has the cutting insert mounted thereon. In particular, the present invention relates to a cutting insert that includes a cutting edge formed on each of two opposite end surfaces, and an indexable rotary cutting tool that has the cutting insert detachably mounted thereon.

BACKGROUND ART

Conventionally, in cutting inserts mounted on an indexable rotary cutting tool, there is the type of cutting insert to have a cutting edge formed on each of an upper surface and a lower surface which are two end surfaces of the cutting insert. This type of cutting insert includes, for example, a cutting insert that can be mounted on a tool body in a manner such that the upper surface and the lower surface are exchanged by flipping it. Furthermore, this cutting insert has cutting edges of which number is greater than that of a single-sided type. For this reason, the double-sided type of cutting insert as described above is economical.

Patent Literature 1 discloses one example of the double-sided type of cutting insert includes cutting edges having the same shape formed on the upper and lower surfaces. This cutting insert is basically configured to include an upper surface and a lower surface, each of which has a substantially quadrilateral shape, and a peripheral side surface connecting to these surfaces. A corner cutting edge is formed on each of a pair of corners disposed at diagonal positions on the upper surface. A major cutting edge is formed on a longer ridgeline portion extending from a corner having a corner cutting edge formed thereat, and a minor cutting edge is formed on a shorter ridgeline portion extending from this corner in a direction different from that of the longer ridgeline portion. The major cutting edge is longer than the minor cutting edge. Similarly, the corner cutting edge, the major cutting edge, and the minor cutting edge are formed on the lower surface. Furthermore, in this cutting insert four corner cutting edges are disposed on the upper and lower surfaces in a manner such that a diagonal line which connects the corner cutting edges diagonally located on the lower surface intersects with a diagonal line which connects the corner cutting edges on the upper surface. As described above, in this cutting insert four corners, each of which can be used in cutting work, are disposed so that the corner cutting edges on the upper surface are not aligned with the corner cutting edges on the lower surface in the thickness direction of the cutting insert. When the cutting edge on the upper surface side is used for cutting, the cutting insert is mounted on the tool body so that the lower surface is brought into abutment with a bottom wall surface of an insert seat of the tool body. On the other hand, when the cutting edge on the lower surface side is used for cutting, the cutting insert is mounted on the tool body so that the upper surface is brought into abutment with the bottom wall surface of the insert seat of the tool body.

CITATION LIST

Patent Literature

PTL 1: WO 2011/122676 A

SUMMARY OF INVENTION

Incidentally, in the case of the double-sided type of cutting insert as with the cutting insert described in Patent Literature 1, cutting edges are formed on both of the upper and lower surfaces. Thus, when a cutting edge formed on one surface side is involved in cutting work, there is a possibility that cutting edges formed on the other surface side are brought into contact with the bottom wall surface of the insert seat, and the contacting portion deforms or wears. To avoid this, the seating surface of the upper surface or lower surface to be brought into contact with the bottom wall surface of the insert seat is formed around a mounting hole, and is spaced apart from the edge portion of the upper or lower surfaces to some degree. With this configuration, the cutting edges (including a cutting edge that has not yet been used) that are located on a surface side facing the inserting seat and are not involved in cutting work are prevented from being brought into contact with the bottom wall surface of the insert seat when the cutting insert is mounted on the insert seat.

However, in the case of the cutting insert having the configuration as described above, the seating surface to be brought into contact with the bottom wall surface of the insert seat is provided inner side of the insert so as to be spaced apart from the cutting edge (in other words, an intersecting ridgeline portion between the upper surface or lower surface and the peripheral side surface). Thus, this cutting insert is supported with the bottom wall surface of the insert seat only at a central portion around the mounting hole of the upper or lower surface, which poses a problem related to supporting of the cutting insert. More specifically, since the cutting insert is supported only at the center portion around the mounting hole of the cutting insert, there is a possibility of occurrence of a problem of chattering or chipping due to swaying of the cutting edge when a large force acts on the cutting edge.

The present invention has been made in view of the problem described above, and an object of the present invention is to provide a cutting insert and an indexable cutting tool, which can more reliably receive a force acting on the cutting edge.

According to one aspect of the present invention, there is provided a cutting insert, which includes:

two opposite end surfaces including a first end surface and a second end surface, each of them having a substantially polygonal shape;

a peripheral side surface that extends between the first end surface and the second end surface; and a plurality of cutting edge sections that are each formed along an intersecting ridgeline portion between the peripheral side surface and each of the first end surface and the second end surface, each of the cutting edge sections including:

a corner cutting edge disposed at a corner portion;
a major cutting edge connected with one end of the corner cutting edge; and a minor cutting edge connected with the other end of the corner cutting edge, in which at least two cutting edge sections and a seating surface are formed on each of the first end surface and the second end surface, each of the cutting edge sections has a rake face on an adjacent end surface, at least a part of each of the cutting edge sections at least protrudes in an insert thickness direction, and a non-cutting intersecting ridgeline area extending between adjacent cutting edge sections on either one of the first end surface and the second end surface is located adjacent, via the peripheral side surface, to at least a part of a portion including the corner cutting edge and the major cutting edge of an associating cutting edge section on the other one of the first end surface and the second end surface. Note that the non-cutting intersecting ridgeline area may be a non-cutting intersecting ridgeline portion itself serving as a part of the intersecting ridgeline portion between the peripheral side surface and the end surface, or may be an area having a certain width or area containing this non-cutting intersecting ridgeline portion. Preferably, the width or the range of this non-cutting intersecting ridgeline area may be designed from the viewpoint of supporting this cutting insert.

Preferably, the non-cutting intersecting ridgeline area on either one of the first end surface and the second end surface extends on a back, in the insert thickness direction, of at least a part of a portion including the corner cutting edge and the major cutting edge of an adjacent cutting edge section on the other one of the first end surface and the second end surface. Furthermore, preferably, the seating surface on each of the first end surface and the second end surface extends to between adjacent cutting edge sections, and is formed integrally with the non-cutting intersecting ridgeline area.

The plural cutting edge sections may be arranged and formed so as to be rotationally symmetrical with respect to a first axis that extends in the insert thickness direction so as to penetrate the first end surface and the second end surface, and also be arranged and formed so as to be rotationally symmetrical with respect to a second axis that is set so as to intersect with the first axis at a right angle and pass through the peripheral side surface.

The non-cutting intersecting ridgeline area on either one of the first end surface and the second end surface may be located adjacent, in the insert thickness direction, to a portion extending from a part of the major cutting edge of the cutting edge section on the other one of the first end surface and the second end surface through the corner cutting edge to a part of the minor cutting edge. Furthermore, alternatively, the non-cutting intersecting ridgeline area on either one of the first end surface and the second end surface may be located adjacent, in the insert thickness direction, to the corner cutting edge and a part of the major cutting edge of the cutting edge section on the other one of the first end surface and the second end surface. In addition, alternatively, the non-cutting intersecting ridgeline area on either one of the first end surface and the second end surface may be located adjacent, in the insert thickness direction, only to the corner cutting edge of the cutting edge section on the other one of the first end surface and the second end surface. Moreover, alternatively, the cutting edge section may further include a second corner cutting edge different from the corner cutting edge and connected with the minor cutting edge, and in this case, the non-cutting intersecting ridgeline area on either one of the first end surface and the second end surface may be located adjacent, in the insert thickness direction, only to a part of the major cutting edge of the cutting edge section on the other one of the first end surface and the second end surface.

According to another aspect of the present invention, there is provided an indexable rotary cutting tool that includes a tool body having at least one insert seat formed thereto, and has a cutting insert detachably mounted on the insert seat. This cutting insert used in the cutting tool is a cutting insert as described above. The insert seat includes a bottom wall surface that is brought into abutment with a seating surface of the cutting insert. Preferably, when the cutting insert is mounted on the insert seat in such a way that one cutting edge section on either one of the first end surface and the second end surface is used, the non-cutting intersecting ridgeline area adjacent to this cutting edge section and located on the other one of the first end surface and the second end surface of the cutting insert is supported by the insert seat.

Preferably, the bottom wall surface of the insert seat includes a portion that can be brought into abutment with the non-cutting intersecting ridgeline area of the cutting insert. In this case, it is preferable that the bottom wall surface of the insert seat integrally contains the portion that can be brought into abutment with the non-cutting intersecting ridgeline area of the cutting insert. However, the bottom wall surface of the insert seat may contain another portion spaced apart from this portion.

According to one aspect of the present invention, the non-cutting intersecting ridgeline area extending between adjacent cutting edge sections on either one of the first end surface and the second end surface is located adjacent, via the peripheral side surface, to at least a part of a portion including the corner cutting edge and the major cutting edge of the cutting edge section on the other one of the first end surface and the second end surface. Thus, by causing the insert seat to support this non-cutting intersecting ridgeline area, it is possible to enhance a supporting performance of the cutting insert. As a result, even in the case where a large cutting force acts on at least a part of the corner cutting edge and the major cutting edge of a cutting edge section located on the opposite side to this non-cutting intersecting ridgeline area, it is possible to more reliably receive or bear a force acting on the cutting edge, and it is possible to considerably prevent the entire cutting edge from swinging, whereby it is possible to significantly reduce occurrence of chattering or chipping.

DESCRIPTION OF EMBODIMENTS

Hereinbelow, embodiments of a cutting insert and a cutting tool according to the present invention will be described in detail with reference to the drawings. First, cutting inserts according to embodiments of the present invention will be described, and then, cutting tools according to embodiments of the present invention will be described.

Figure 1:
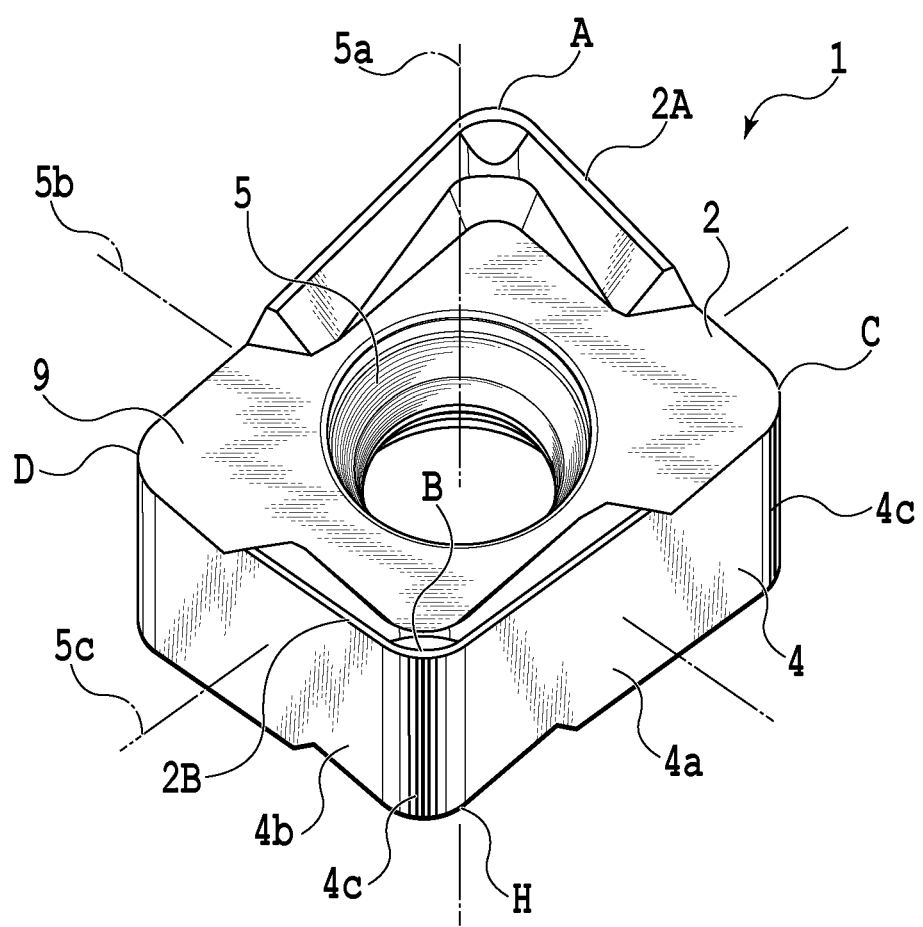
FIG. 1 is a perspective view illustrating a cutting insert according to a first embodiment of the present invention.

First, a cutting insert 1 according to a first embodiment of the present invention will be described with reference to FIG. 1, and FIG. 2A to FIG. 2D. The cutting insert 1 according to this first embodiment includes two opposite end surfaces 2 and 3 and a peripheral side surface 4 extending therebetween, and is configured basically by these surfaces. One of the end surfaces 2 and 3 serves as a first end surface, and the other serves as a second end surface. In the cutting insert 1, a through-hole 5 having an opening substantially at the center of each of the end surfaces 2 and 3 is formed. The through-hole 5 is provided so that a tightening screw is inserted thereinto, and extends in a thickness direction of the cutting insert (in a direction in which the end surfaces 2 and 3 are connected). Note that this thickness direction of the cutting insert is, hereinafter, referred to as an insert thickness direction, and is a direction in parallel to an axis (first axis) 5a of the through-hole 5. In the following description, one end surface 2 of the two end surfaces illustrated in FIG. 1 is referred to as an upper surface, and the other end surface 3 of the two end surfaces is referred to as a lower surface. In the following description, terms "upper" and "lower" are used according to a relative relationship between positions of the upper surface 2 and the lower surface 3. However, these terms are only used or set for the purpose of explaining or facilitating understanding, and these are not intended to limit the present invention.

The upper surface 2 has an outline with a substantially quadrilateral shape. The lower surface 3 also has an outline with a substantially quadrilateral shape, and has a shape almost equal to the shape of the upper surface 2. Main portions of the upper surface 2 and the lower surface 3 are each configured so as to be rotationally symmetrical about the axis 5a of the mounting hole 5. Here, since the upper and lower surfaces 2 and 3 each have a substantially quadrilateral shape, each of the upper and lower surfaces 2 and 3 has 2-fold rotational symmetry about the axis 5a. The upper surface 2 and the lower surface 3 are mainly configured so as to have (2-fold) rotational symmetry about an axis 5b or an axis 5c serving as a second axis that is set so as to intersect with the axis 5a at a right angle and pass through the peripheral side surface. Since the upper and lower surfaces 2 and 3 have a substantially quadrilateral shape, the peripheral side surface 4 includes four side surface portions 4a and 4b, and four corner surface portions 4c. The four side surface portions include first side surface portions 4a and 4a, and second side surface portions 4b and 4b. The first side surface portion 4a is larger than the second side surface portion 4b. Each of the corner surface portions 4c connects the first side surface portion 4a and the second side surface portion 4b adjacent to each other.

Here, corners on two intersecting diagonal lines (not illustrated) in a plan view (FIG. 2A) of the upper surface 2 are referred to as a corner A, a corner B, a corner C, and a corner D. Note that the corners A to D are each associated with a corresponding corner surface portion 4c. The corner A and the corner B form a pair located on the same diagonal line, and the corner C and the corner D form a pair located on the same diagonal line. Thus, the corners A to D are arranged in the order of the corners A, C, B, and then, D in a clockwise direction in FIG. 2A. Similarly, corners on two intersecting diagonal lines (not illustrated) in a plan view (FIG. 2C) of the lower surface 3 are referred to as a corner E, a corner F, a corner G, and a corner H. The corner E and the corner F form a pair located on the same diagonal line, and the corner G and the corner H form a pair located on the same diagonal line. Thus, the corners E to H are arranged in the order of the corners E, G, F, and then, H in a clockwise direction in FIG. 2C. In the cutting insert 1, the corner G is located at a position on the lower surface 3 opposite, in the upper-lower direction (insert thickness direction), to the corner A on the upper surface 2, in other words, is located on the back of the corner A (in other words, at a position adjacent in a direction of the axis 5a). The corner H is located at a position on the lower surface 3 opposite, in the upper-lower direction, to the corner B on the upper surface 2, in other words, is located on the back of the corner B. The corner E is located at a position on the lower surface 3 opposite, in the upper-lower direction, to the corner C on the upper surface 2, in other words, is located on the back of the corner C. The corner F is located at a position on the lower surface 3 opposite, in the upper-lower direction, to the corner D on the upper surface 2, in other words, is located on the back of the corner D.

In this embodiment, cutting edges (cutting edge sections) 2A and 2B are formed on a part of an intersecting ridgeline portion between the upper surface 2 and the peripheral side surface 4. First, a corner cutting edge 6 is formed on an intersecting ridgeline portion located at the corner A. The corner cutting edge 6 is a cutting edge that extends in a curved manner over a certain area including an apex of the corner A in a plan view of the upper surface 2. A major cutting edge 7 is formed at one end of the corner cutting edge 6 so as to be connected with the corner cutting edge 6. A minor cutting edge 8 is formed at the other end of the corner cutting edge 6 so as to be connected with the corner cutting edge 6. Similarly, the corner cutting edge 6, the major cutting edge 7, and the minor cutting edge 8 are formed at the corner B on the diagonal line associated with the corner A. As described above, the cutting edge sections 2A and 2B, in other words, the corner cutting edges 6 are formed only at the pair of the corner A and the corner B located on one diagonal line of two diagonal lines intersecting on the upper surface 2. Note that, here, the major cutting edge 7 is longer than the minor cutting edge 8. As described above, the corner cutting edge 6, the major cutting edge 7, and the minor cutting edge 8 are continuous to form one cutting edge section, and each of the cutting edge sections 2A and 2B is configured to include the corner cutting edge 6, the major cutting edge 7, and the minor cutting edge 8. Note that the cutting edge sections 2A and 2B are arranged so as to have 2-fold rotational symmetry about the axis 5a of the mounting hole 5.

Here, the corner cutting edge 6, the major cutting edge 7, and the minor cutting edge 8 are formed so as to protrude in the insert thickness direction, in other words, in a direction of the axis 5a, as compared with the seating surface 9 on the upper surface 2. The seating surface 9 represents a abutting surface that is formed on the upper surface 2 or the lower surface 3 and is to be brought into contact with a bottom wall surface 23 of an insert seat 22 provided on a tool body 21, which will be described later. In the case of the cutting insert having two surfaces usable as with this embodiment, the upper surface 2 and the lower surface 3 are each used as an attachment surface, and hence, the seating surface 9 is provided as an abutment portion on each of the upper surface 2 and the lower surface 3. Note that the seating surface 9 on each of the surfaces mainly extends in the vicinity of the mounting hole 5.

Furthermore, the corner cutting edge 6 and the cutting edge section are formed so that a portion corresponding to the apex of the corner cutting edge 6 is located farthest from the seating surface 9 in the direction of the first axis 5a in a plan view (FIG. 2A) of the cutting insert. Here, the portion corresponding to the apex of the corner cutting edge 6 in a plan view of the cutting insert is located on a line, although this line is not illustrated, set so as to connect the corners A and B and pass through the first axis 5a in FIG. 2A. However, this portion may be deviated from this line. For example, the portion corresponding to the apex of the corner cutting edge 6 may be located on a bisector of this corner in the plan view.

In addition, as a distance from the apex portion of the corner cutting edge 6 increases toward the major cutting edge 7 side or the minor cutting edge 8 side, the major cutting edge 7 or the minor cutting edge 8 approaches the seating surface 9 in the direction of the first axis 5a, in other words, the height of the cutting edge with respect to the seating surface 9 gradually decreases. The major cutting edge 7 and the minor cutting edge 8 each end at a portion spaced apart by a certain distance from the corner cutting edge 6. The major cutting edge 7 and the minor cutting edge 8, which protrude in the insert thickness direction, disappear at a position located apart from the corner cutting edge 6 by a certain distance toward the major cutting edge 7 side or the minor cutting edge 8 side, and the seating surface 9 extends to an intersecting ridgeline portion adjacent to each of these cutting edges. In this embodiment, on the upper surface 2, the major cutting edge 7 starts from the corner A or B on one side and ends at an end portion, located on a near side, of a corner area of the corner D or C on the other side. In other words, the major cutting edge 7, which protrudes toward the direction of the axis 5a with reference to the seating surface 9, disappears at some midpoint between the corner A or B on one side and the corner D or C on the other side. Furthermore, the minor cutting edge 8 starts from the corner A or B on one side and ends at an end portion, located on a near side, of a corner area of the corner C or D on the other side. In other words, the minor cutting edge 8, which protrudes in the direction of the axis 5a with respect to the seating surface 9, disappears at some midpoint between the corner A or B on one side and the corner C or D on the other side. As described above, the seating surface 9 extends to between the cutting edge sections 2A and 2B, and forms the intersecting ridgeline portions 9a and 9b with the peripheral side surface 4. Note that the intersecting ridgeline portions 9a and 9b are not configured as a cutting edge, and hence, may be called a non-cutting intersecting ridgeline portion. An outer edge side area on the upper surface 2 including this non-cutting intersecting ridgeline portion is called a non-cutting intersecting ridgeline area 2C, 2D.

Furthermore, on the lower surface 3, cutting edges (cutting edge sections) 3A and 3B are formed on a part of an intersecting ridgeline portion between the lower surface 3 and the peripheral side surface 4, as on the upper surface 2. The two cutting edge sections 3A and 3B are arranged so as to have 2-fold rotational symmetry about the axis 5A of the mounting hole 5. The cutting edge sections 3A and 3B each have the same configuration as the cutting edge sections 2A and 2B on the upper surface 2, and are each formed to include the corner cutting edge 6, the major cutting edge 7, and the minor cutting edge 8. Furthermore, the cutting edge sections 2A and 2B on the upper surface 2 are associated with the cutting edge sections 3A and 3B on the lower surface 3 so as to have (2-fold) rotational symmetry about both the axis 5B and the axis 5C.

More specifically, the corner cutting edge 6 is formed on an intersecting ridgeline portion located at the corner E on lower surface 3. The corner cutting edge 6 is a cutting edge that extends in a curved manner over a certain area from an apex of the corner E in a plan view (FIG. 2C) of the cutting insert. The major cutting edge 7 is formed at one end of the corner cutting edge 6 so as to be connected with the corner cutting edge 6. On the other hand, the minor cutting edge 8 is formed at the other end of the corner cutting edge 6 so as to be connected with the corner cutting edge 6. Similarly, the corner cutting edge 6, the major cutting edge 7, and the minor cutting edge 8 are formed at the corner F located on the diagonal line associated with the corner E. In other words, the cutting edge sections, in other words, the corner cutting edges 6 are formed only at the corners located on one diagonal line of two diagonal lines intersecting on the lower surface 3. At this time, the major cutting edge 7 is longer than the minor cutting edge 8. The corner cutting edge 6, the major cutting edge 7, and the minor cutting edge 8 on the lower surface 3 protrude in the insert thickness direction with reference to the seating surface 9 as with each of the cutting edges on the upper surface 2. In addition, the major cutting edge 7 or the minor cutting edge 8 approaches the seating surface 9 in the direction of the axis 5a with an increasing distance from the apex portion of the corner cutting edge 6, and disappears at a position located apart from the corner cutting edge 6 by a certain distance (in other words, the raised portion from the seating surface 9 becomes nonexistent, and the height of the intersecting ridgeline portion become equal to that of the seating surface 9). Moreover, as with the upper surface 2, the major cutting edge 7, which protrudes in the direction of the axis 5a with reference to the seating surface 9, disappears at some midpoint between the corner E or F on one side and the corner H or G on the other side. The minor cutting edge 8, which protrudes in the direction of the axis 5a with respect to the seating surface 9, disappears at some midpoint between the corner E or F on one side and the corner G or H on the other side. Furthermore, on the lower surface 3, the seating surface 9 extends to between the cutting edge sections 3A and 3B, and forms the intersecting ridgeline portions (non-cutting intersecting ridgeline portions) 9c and 9d with the peripheral side surface 4. Thus, on the lower surface 3, non-cutting intersecting ridgeline areas 3C and 3D extend between adjacent cutting edge sections 3A and 3B, as with the upper surface 2.

Figure 2A:
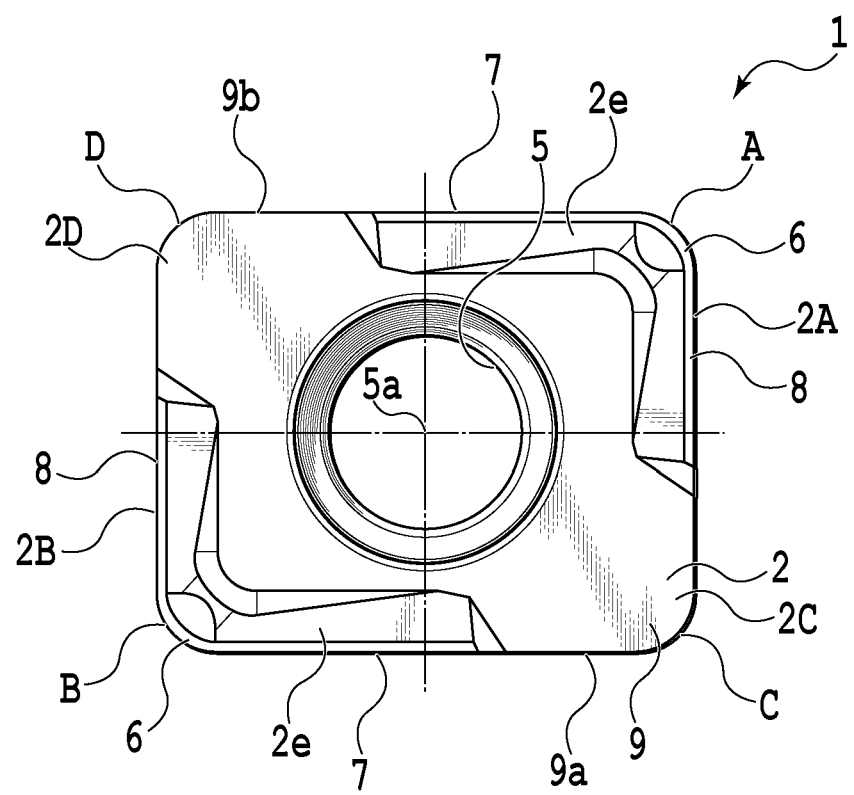
FIG. 2A is a plan view illustrating the cutting insert in FIG. 1.
Figure 2B:
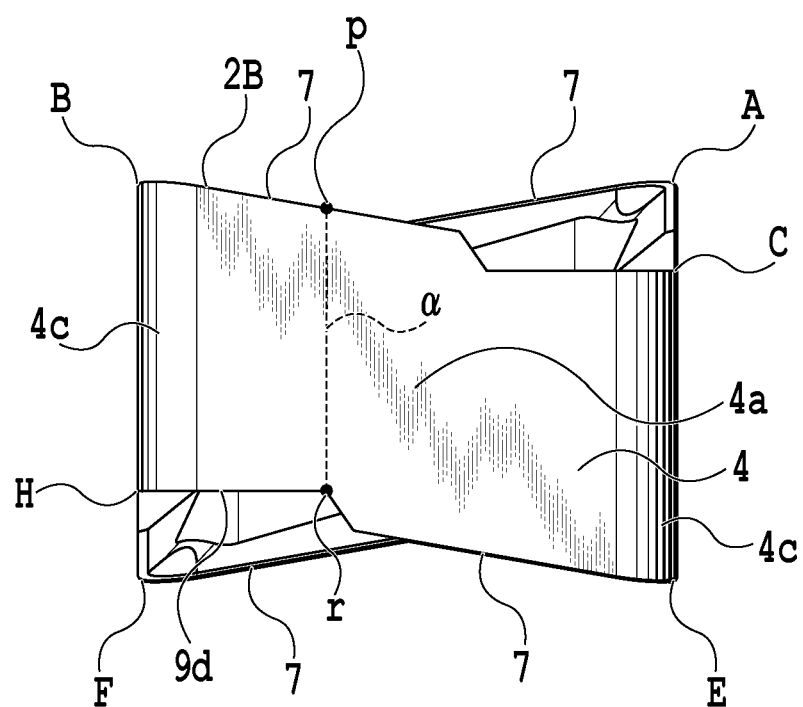
FIG. 2B is an elevation view illustrating the cutting insert in FIG. 1.
Figure 2C:
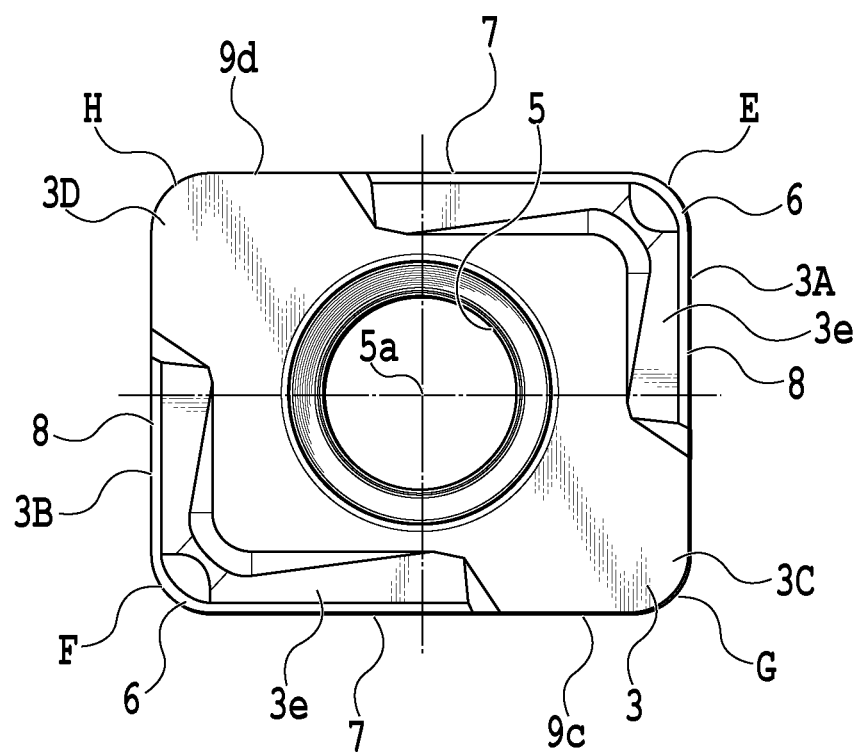
FIG. 2C is a bottom view illustrating the cutting insert in FIG. 1.
Figure 2D:
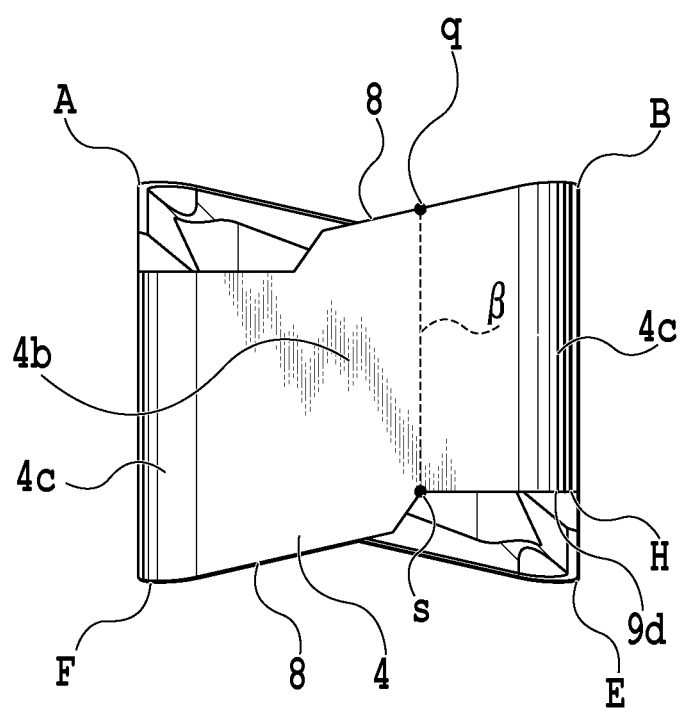
FIG. 2D is a left-side view illustrating the cutting insert in FIG. 1.
Figure 3:
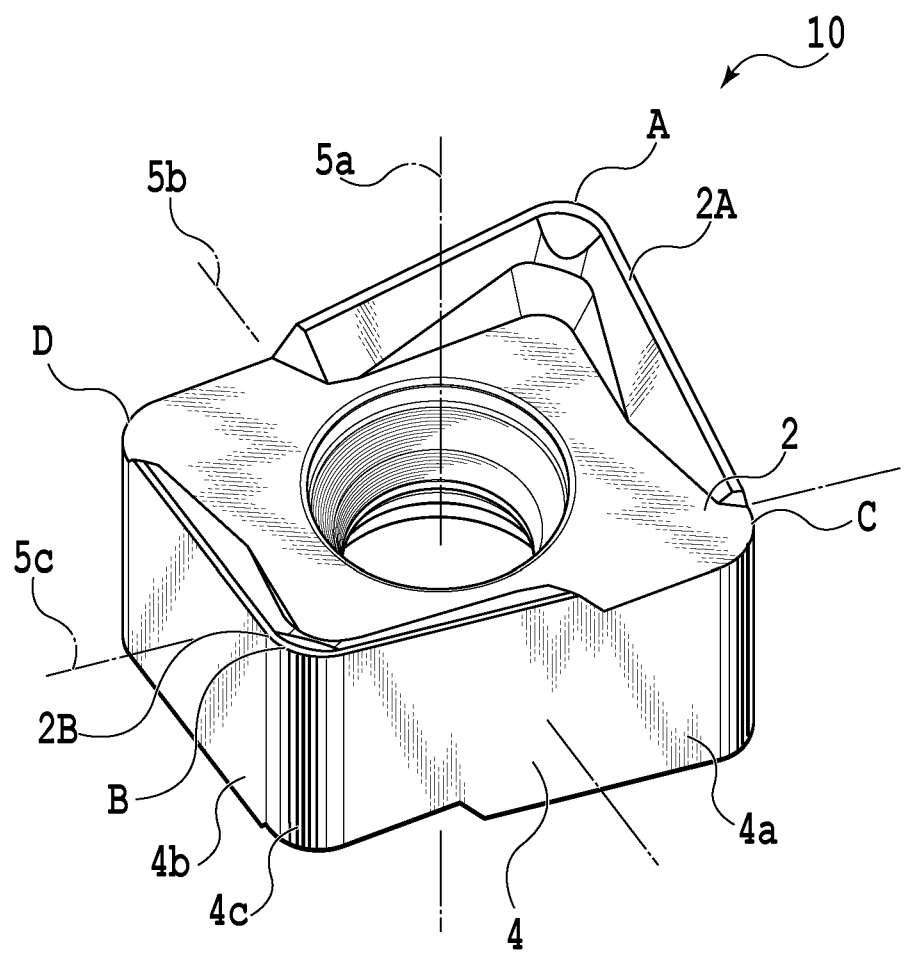
FIG. 3 is a perspective view illustrating a cutting insert according to a second embodiment of the present invention.
Figure 4A:
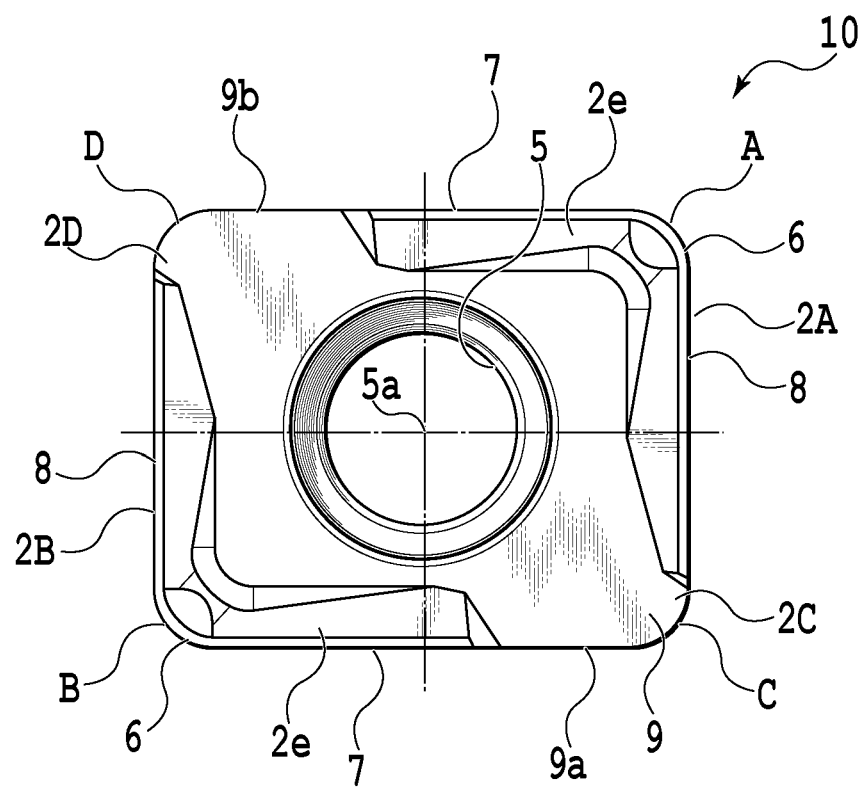
FIG. 4A is a plan view illustrating the cutting insert in FIG. 3.
Figure 4B:
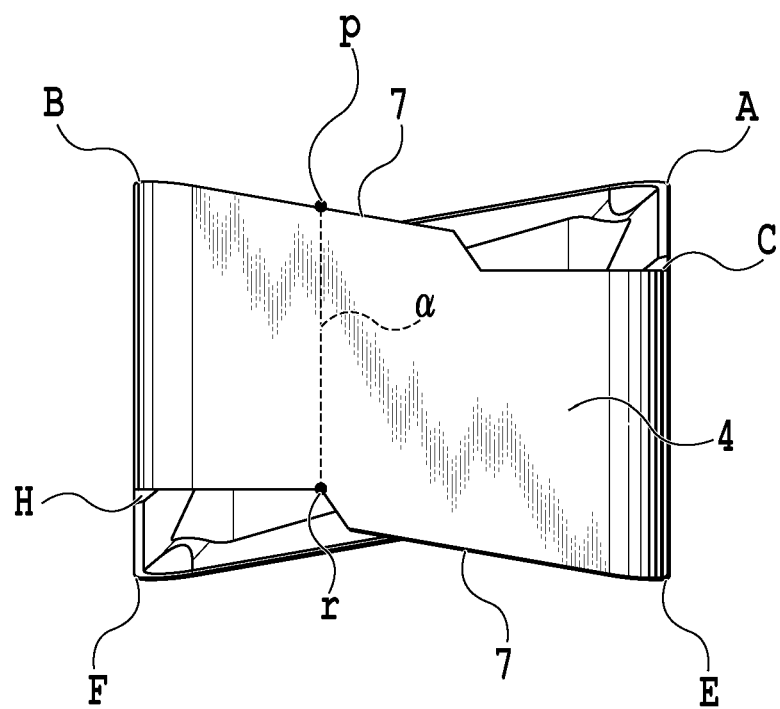
FIG. 4B is an elevation view illustrating the cutting insert in FIG. 3.
Figure 4C:
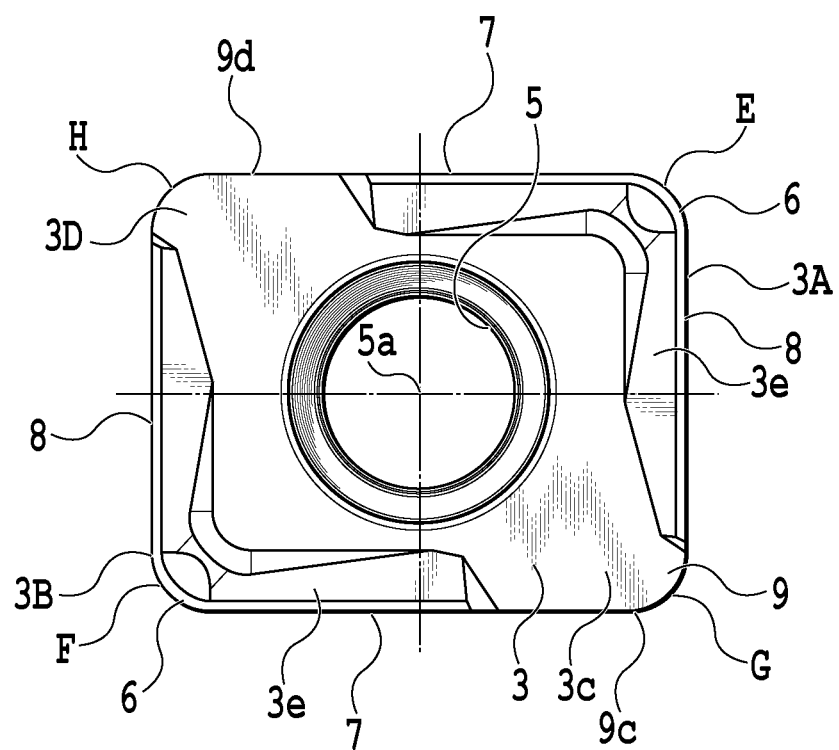
FIG. 4C is a bottom view illustrating the cutting insert in FIG. 3.
Figure 4D:
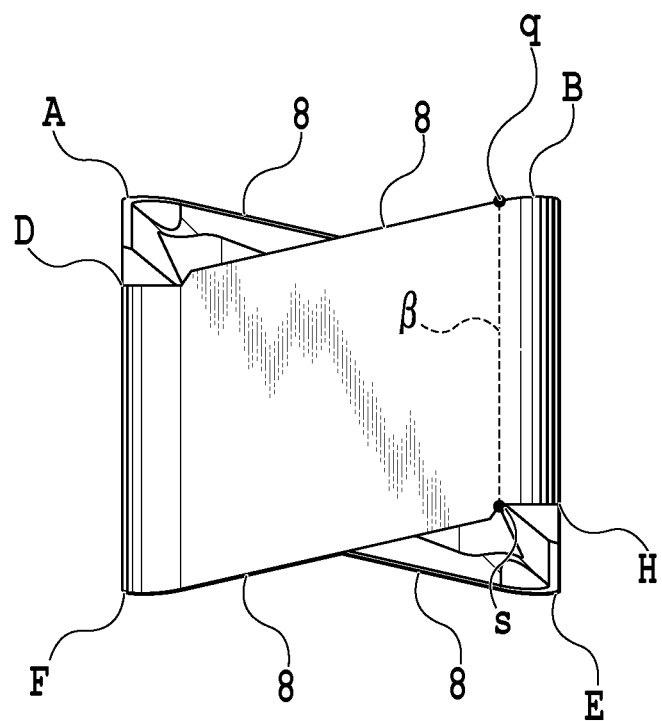
FIG. 4D is a left-side view illustrating the cutting insert in FIG. 3.
Figure 5:
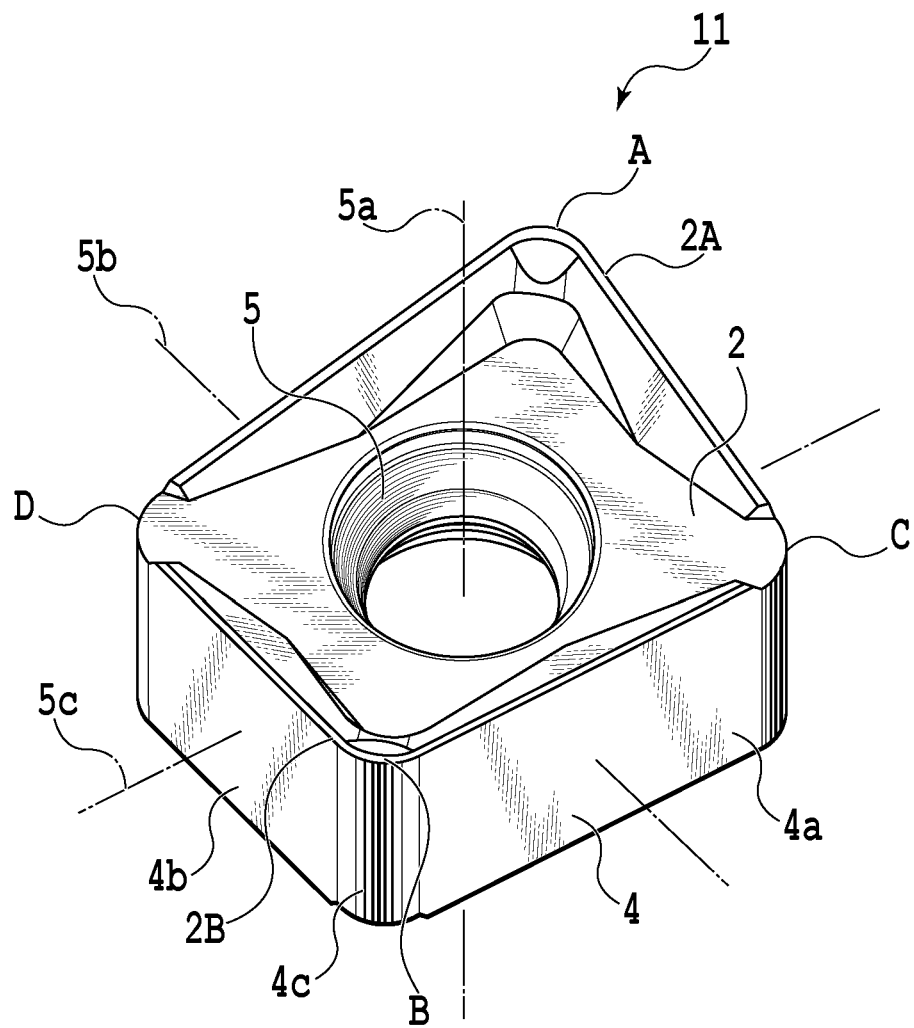
FIG. 5 is a perspective view illustrating a cutting insert according to a third embodiment of the present invention.
Figure 6A:
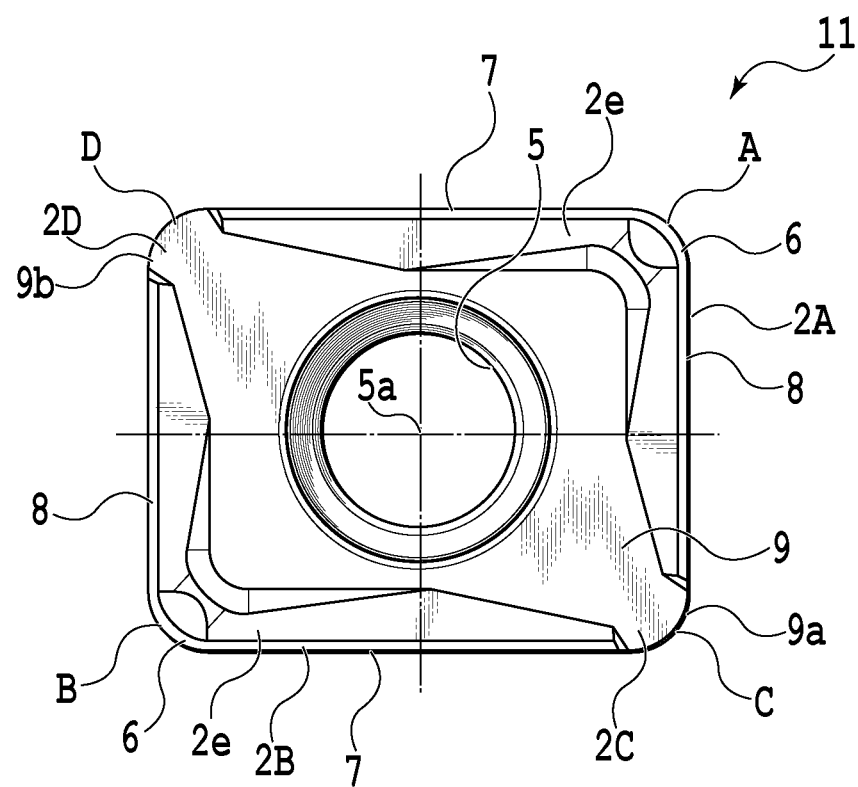
FIG. 6A is a plan view illustrating the cutting insert in FIG. 5.
Figure 6B:
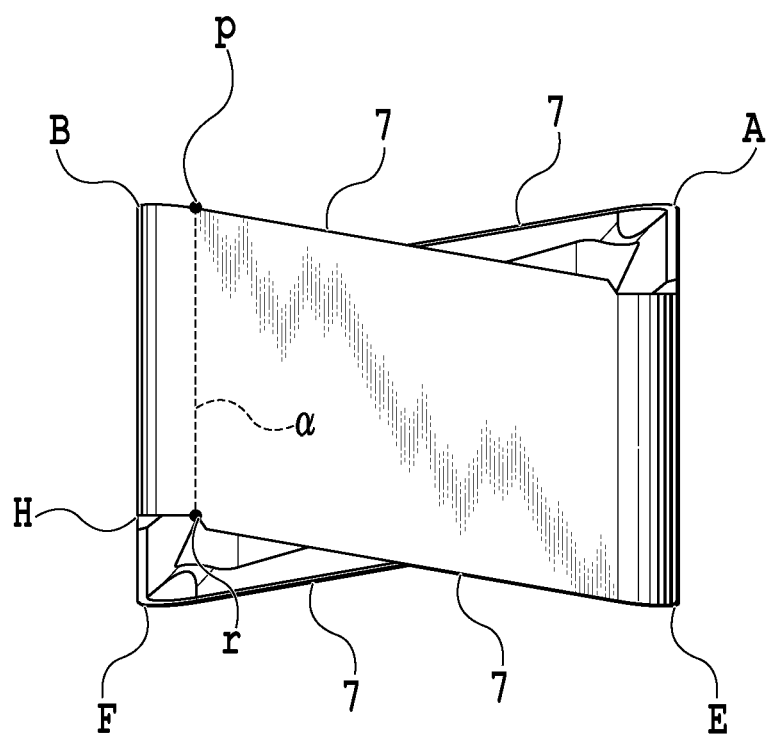
FIG. 6B is an elevation view illustrating the cutting insert in FIG. 5.
Figure 6C:
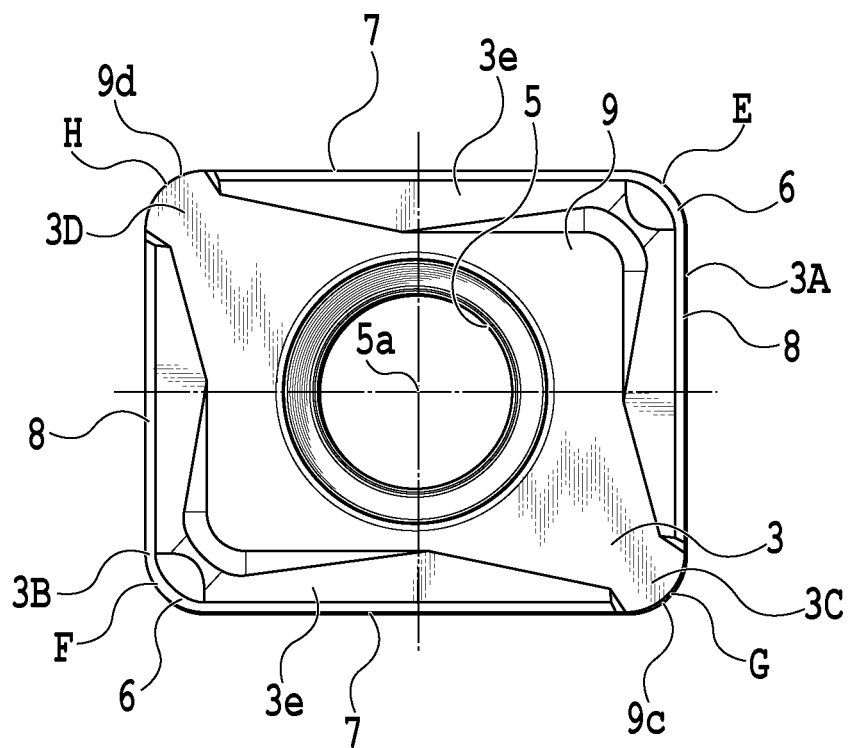
FIG. 6C is a bottom view illustrating the cutting insert in FIG. 5.
Figure 6D:
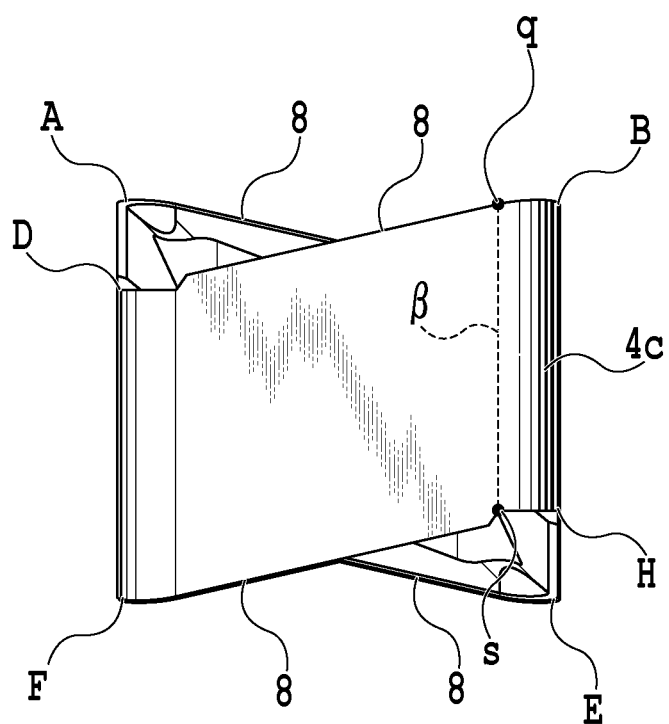
FIG. 6D is a left-side view illustrating the cutting insert in FIG. 5.
Figure 7:
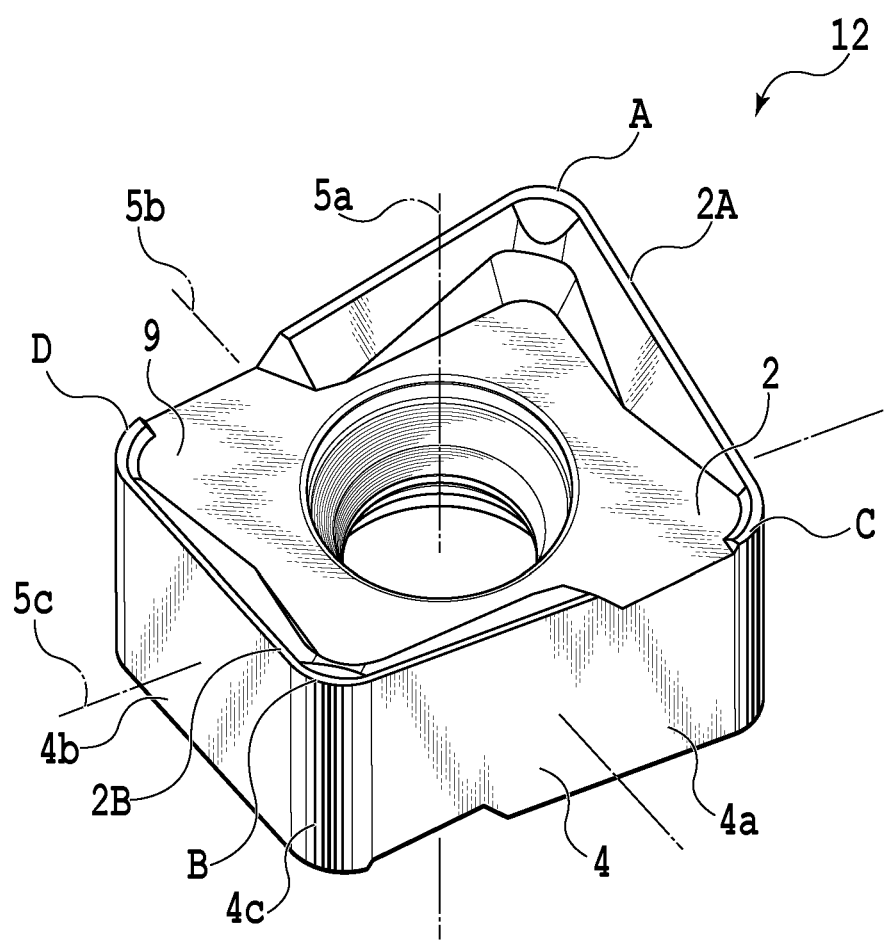
FIG. 7 is a perspective view illustrating a cutting insert according to a fourth embodiment of the present invention.
Figure 8A:
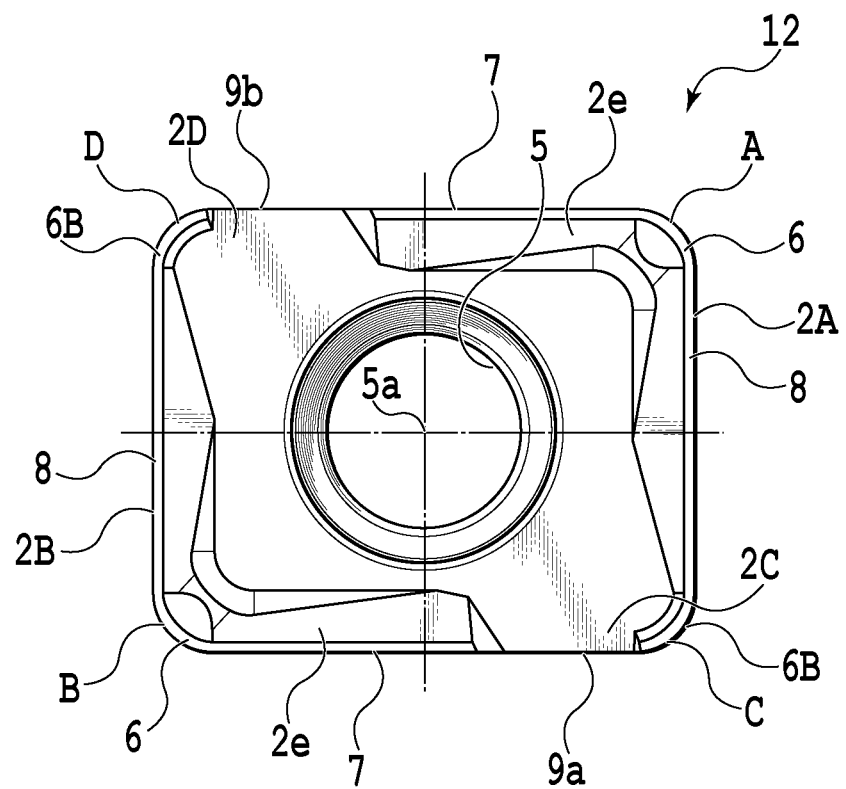
FIG. 8A is a plan view illustrating the cutting insert in FIG. 7.
Figure 8B:
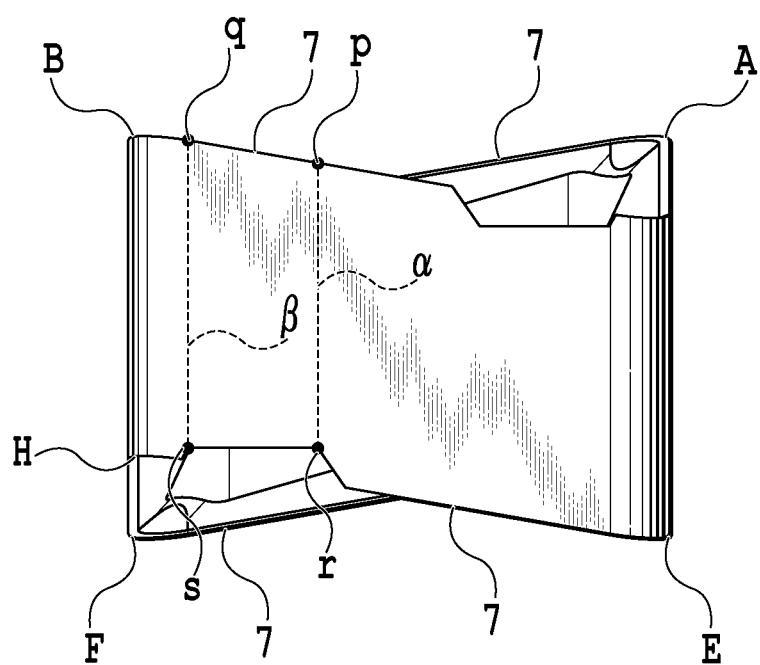
FIG. 8B is an elevation view illustrating the cutting insert in FIG. 7.
Figure 8C:
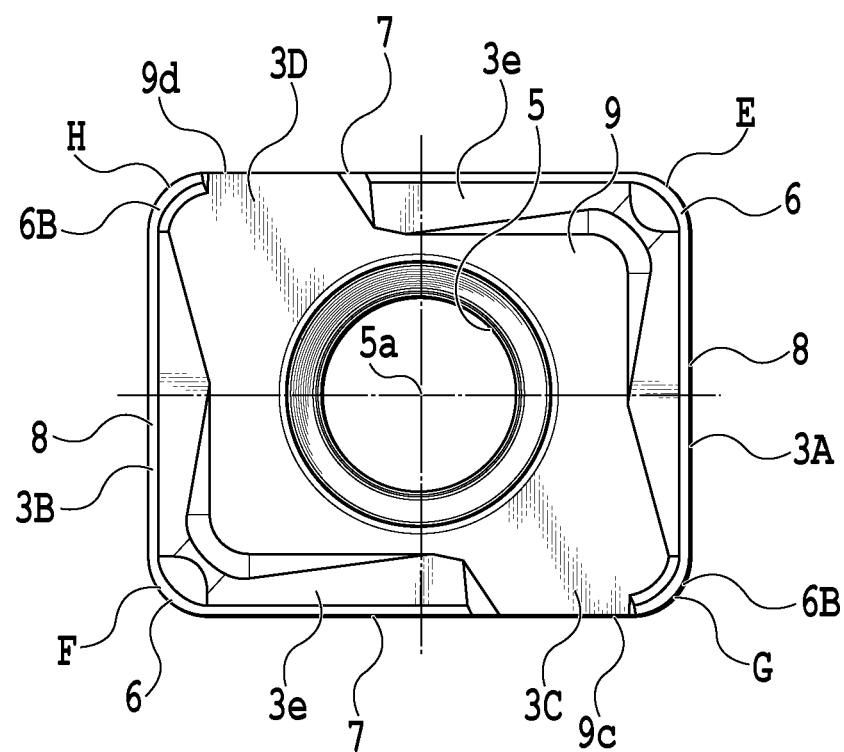
FIG. 8C is a bottom view illustrating the cutting insert in FIG. 7.
Figure 8D:
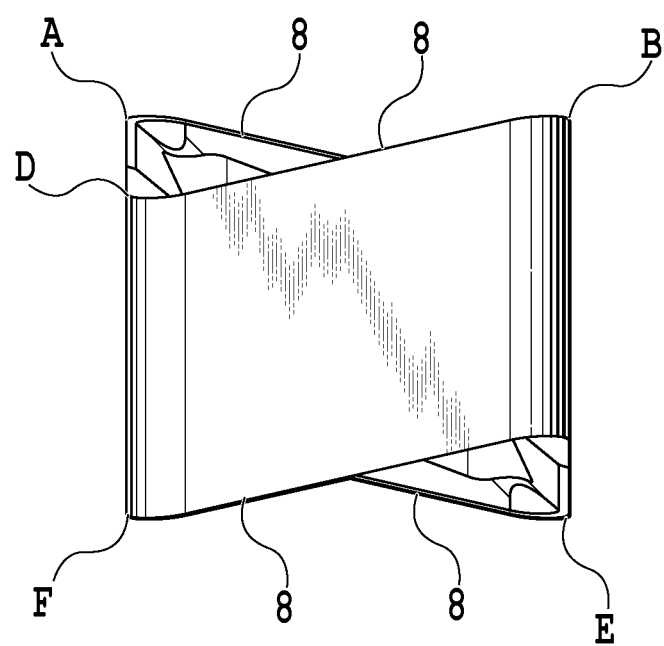
FIG. 8D is a left-side view illustrating the cutting insert in FIG. 7.

In this case, a corner (in other words, a corner on the side of the lower surface 3 located immediately below the corner A on the upper surface 2 in FIG. 2A) on the side of the lower surface 3 located adjacent, via the peripheral side surface 4, to the corner A on the upper surface 2 in the insert thickness direction, in other words, in the direction of the first axis 5A is the corner G at which no protruding cutting edge is formed. The same applies to the side of the corner B on the upper surface 2. A corner (in other words, a corner on the side of the lower surface 3 located immediately below the corner B on the upper surface 2 in FIG. 2A) on the side of the lower surface 3 located adjacent, via the peripheral side surface 4, to the corner B on the upper surface 2 in the insert thickness direction is the corner H at which no cutting edge that protrudes from the seating surface 9 is formed. In other words, in the case where the corners A and B, at each of which the corner cutting edge 6 is formed, are disposed on one diagonal line on the upper surface 2, the corners E and F, at each of which the corner cutting edge 6 is formed, are disposed on a diagonal line on the lower surface 3 extending in a direction intersecting the one diagonal line on the upper surface 2 in a plan view. Thus, the seating surface 9 on the lower surface 3 continues to the corner G on the lower surface 3, which is located opposite to the corner A on the upper surface 2; the seating surface 9 on the lower surface 3 continues to the corner H on the lower surface 3, which is located opposite to the corner B on the upper surface 2; the seating surface 9 on the upper surface 2 continues to the corner C on the upper surface 2, which is located opposite to the corner E on the lower surface 3; and the seating surface 9 on the upper surface 2 continues to the corner D on the upper surface 2, which is located opposite to the corner F on the lower surface 3.

Thus, a non-cutting intersecting ridgeline area is located on the back (in the direction of the axis 5a) of a portion extending from a part of the major cutting edge through the corner cutting edge to a part of the minor cutting edge, of one cutting edge section on either one of the upper and lower surfaces. Here, attention is paid to one corner B on the upper surface 2. A line α that is in parallel to the axis 5a is drawn in FIG. 2B so as to pass through one point p located on the major cutting edge 7 and spaced apart from the corner cutting edge 6 of the cutting edge section 2B associated with the corner B. Similarly, a line β that is in parallel to the axis 5a is drawn in FIG. 2D so as to pass through one point q located on the minor cutting edge 8 and spaced apart from the corner cutting edge 6 of the cutting edge section 2B. The line α, which passes through the point p, reaches an end portion r of the non-cutting intersecting ridgeline area 3D extending in the vicinity of the corner H on the lower surface 3 in FIG. 2B. Furthermore, the line β, which passes through the point q, reaches another end portion s of the non-cutting intersecting ridgeline area 3D extending in the vicinity of the corner H on the lower surface 3 in FIG. 2D. The same applies to other cutting edge sections. As can be clearly understood from the descriptions above, in the cutting insert 1, a portion continuing from a part of the major cutting edge of one cutting edge section on either one of the upper and lower surfaces through the corner cutting edge to a part of the minor cutting edge extends on the back (in the direction of the axis 5a) of one non-cutting intersecting ridgeline area on the other one of the upper and lower surfaces.

It should be noted that each of the cutting edge sections is formed so as to protrude in the direction of the axis 5a, and here, in particular, is formed so as to protrude only in the direction of the axis 5a. Furthermore, as can be clearly understood from FIG. 1 to FIG. 2D, a rake face related to each of the cutting edge sections is formed on each of the upper surface 2 and lower surface 3, and flanks are formed on the peripheral side surface 4. Thus, as each of the cutting edge sections protrudes in the direction of the axis 5a, each rake face 2e and 3e extends so as to be sloped with respect to a plane that is set so as to be perpendicular to the axis 5a, thereby being formed so as to contribute to formation of a positive rake angle. Furthermore, in this embodiment, the seating surface 9 is a flat surface, and the non-cutting intersecting ridgeline area is also formed so as to be a flat surface as with other portions on the seating surface 9. However, the seating surface 9 and/or the non-cutting intersecting ridgeline area are not limited to be a flat surface, and may be formed into various shapes. An insert seat, which will be described later, is designed according to shapes of the seating surface or the non-cutting intersecting ridgeline area.

As described above, in the cutting insert according to this first embodiment, the major cutting edge 7 extends along a part of the intersecting ridgeline portion between the first side surface portion 4a of the peripheral side surface 4 and each of the upper and lower surfaces 2 and 3, more specifically, along a portion of approximately over half the intersecting ridgeline portion. Furthermore, the minor cutting edge 8 extends along a part of the intersecting ridgeline portion between the second side surface portion 4b of the peripheral side surface 4 and each of the upper and lower surfaces 2 and 3, more specifically, along approximately over half the intersecting ridgeline portion. In addition, each of the non-cutting intersecting ridgeline portions 9a, 9b, 9c, 9d on either one of the upper and lower surfaces 2 and 3 is associated with a portion from a part of the major cutting edge 7 through the corner cutting edge 6 to a part of the minor cutting edge 8, of the cutting edge section 3A, 3B, 2A, 2B on the other one of the upper and lower surfaces 2 and 3. Thus, in the cutting insert 1, the non-cutting intersecting ridgeline portion and the non-cutting intersecting ridgeline area are located on the back, in the direction of the first axis, of a part of the major cutting edge, the corner cutting edge, and a part of the minor cutting edge of each of the cutting edge sections, and the seating surface 9 extends up to there.

Next, a cutting insert 10 according to a second embodiment of the present invention will be described with reference to FIG. 3, and FIG. 4A to FIG. 4D. The cutting insert 10 according to this second embodiment basically has a similar configuration to the cutting insert 1 according to the first embodiment, and hence, only different configuration elements will be described below. Furthermore, similar terms and reference signs are used for configurations (elements) of the cutting insert 10 similar to those of the cutting insert 1 according to the first embodiment.

The cutting insert 10 according to this second embodiment differs from the cutting insert 1 according to the first embodiment in an area of the cutting edge sections formed on the intersecting ridgeline portion between the upper surface 2 and the peripheral side surface 4 or on the intersecting ridgeline portion between the lower surface 3 and the peripheral side surface 4. More specifically, the difference from that of the first embodiment lies in the area in which the minor cutting edge 8 connecting with the corner cutting edge 6 at the corner A, B, E or F is formed on the upper surface 2 or the lower surface 3. The minor cutting edge 8 is formed continuously from the corner A, B, E or F on one side to an end portion, located on a near side, of a corner area of the corner C, D, G or H on the other side, without discontinuation. In the cutting insert 1 according to the first embodiment, the minor cutting edge 8 disappears before reaching the corner area of the corner C, D, G or H on the other side. However, in this embodiment, the minor cutting edge 8 is formed in a protruding manner so as to reach the end portion of the corner area of the corner C, D, G, or H on the other side.

Thus, one non-cutting intersecting ridgeline portion is located adjacent only to a part of the major cutting edge and the corner cutting edge of one associating cutting edge section. Here, attention is paid to one corner B on the upper surface 2. A line α that is in parallel to the axis 5a is drawn in FIG. 4B so as to pass through one point p located on the major cutting edge and spaced apart from the corner cutting edge 6 of the cutting edge section 2B associated with the corner B. Similarly, a line β that is in parallel to the axis 5a is drawn in FIG. 4D so as to pass through a point q located at an end portion of the corner cutting edge 6 of the cutting edge section 2B on the minor cutting edge 8 side. The line α, which passes through the point p, reaches an end portion r of the non-cutting intersecting ridgeline area 3D extending in the vicinity of the corner H on the lower surface 3 in FIG. 4B. Furthermore, the line β, which passes through the point q, reaches another end portion s of the non-cutting intersecting ridgeline area 3D extending in the vicinity of the corner H on the lower surface 3 in FIG. 4D. The same applies to other cutting edge sections. Thus, in the cutting insert 10, a portion continuing from a part of the major cutting edge to the corner cutting edge, of one cutting edge section on either one of the upper and lower surfaces extends on the back (in the direction of the axis 5a) of one non-cutting intersecting ridgeline area on the other one of the upper and lower surfaces.

As described above, in the cutting insert 10 according to this second embodiment, the minor cutting edge 8 extends substantially throughout the entire intersecting ridgeline portion between the second side surface portion 4b of the peripheral side surface 4 and each of the upper and lower surfaces 2 and 3. Thus, in the cutting insert 10, the non-cutting intersecting ridgeline portion 9a, 9b, 9c, 9d and the non-cutting intersecting ridgeline area 2A, 2B, 3C, 3D exist only on the back, in the direction of the first axis, of a part of the major cutting edge and the corner cutting edge of each of the cutting edge sections.

Next, a cutting insert 11 according to a third embodiment of the present invention will be described with reference to FIG. 5, and FIG. 6A to FIG. 6D. The cutting insert 11 according to this embodiment also basically has a similar configuration to the cutting insert 1 according to the first embodiment, and hence, only different configuration elements will be described below. Furthermore, similar terms and reference signs are used for the configurations (elements) of the cutting insert 11 similar to those of the cutting insert 1 according to the first embodiment.

The cutting insert 11 according to this third embodiment differs from the cutting insert 1 according to the first embodiment in an area of the cutting edge section formed on the intersecting ridgeline portion between the upper surface 2 and the peripheral side surface 4 or on the intersecting ridgeline between the lower surface 3 and the peripheral side surface 4. More specifically, the cutting insert 11 differs from the cutting insert 1 according to the first embodiment in an area in which the major cutting edge 7 and the minor cutting edge 8, each of which is connected with the corner cutting edge 6 at the corner A, B, E or F, are formed on the upper surface 2 or the lower surface 3. The major cutting edge 7 is formed continuously from the corner A, B, E or F on one side to an end portion, located on a near side, of a corner area of the corner D, C, H, or G on the other side without discontinuation. In other words, the major cutting edge 7 is formed in a protruding manner to an end portion of the corner area of the corner D, C, H, or G on the other side. Furthermore, the minor cutting edge 8 is formed continuously from the corner A, B, E or F on one side to an end portion, located on a near side, of a corner area of the corner C, D, G or H on the other side without discontinuation. In other words, the minor cutting edge 8 is formed in a protruding manner to an end portion of the corner area of the corner C, D, G or H on the other side. As described above, in this embodiment, the corner C and the corner D on the upper surface 2, and the corner G and the corner H on the lower surface 3 are only portions that do not have the cutting edge formed thereon of the intersecting ridgeline portion between the peripheral side surface 4 and the upper and lower surfaces 2 and 3.

Thus, one non-cutting intersecting ridgeline portion is located adjacent only to a corner cutting edge of one associating cutting edge section. Here, attention is paid to one corner B on the upper surface 2. A line α that is in parallel to the axis 5a is drawn in FIG. 6B so as to pass through a point p located at an end portion of the corner cutting edge 6, on the major cutting edge side, of the cutting edge section 2B associated with the corner B. Similarly, a line β that is in parallel to the axis 5a is drawn in FIG. 6D so as to pass through a point q located at an end portion of the corner cutting edge 6 of the cutting edge section 2B on the minor cutting edge side. The line α, which passes through the point p, reaches an end portion r of the non-cutting intersecting ridgeline area 3D extending in the vicinity of the corner H on the lower surface 3 in FIG. 6B. Furthermore, the line β, which passes through the point q, reaches another end portion s of the non-cutting intersecting ridgeline area 3D extending in the vicinity of the corner H on the lower surface 3 in FIG. 6D. The same applies to other cutting edge sections. Thus, in the cutting insert 11, the corner cutting edge of one cutting edge section on either one of the upper and lower surfaces extends on the back (in the direction of the axis 5a) of one non-cutting intersecting ridgeline area on the other one of the upper and lower surfaces.

As described above, in the cutting insert 11 according to this third embodiment, the major cutting edge 7 extends substantially throughout the entire intersecting ridgeline portion between the first side surface portion 4a of the peripheral side surface 4 and each of the upper and lower surfaces 2 and 3, and the minor cutting edge 8 extends substantially throughout the entire intersecting ridgeline portion between the second side surface portion 4b of the peripheral side surface 4 and each of the upper and lower surfaces 2 and 3. Thus, in the cutting insert 10, the non-cutting intersecting ridgeline portion 9a, 9b, 9c, 9d and the non-cutting intersecting ridgeline area 2A, 2B, 3C, 3D exist only on the back, in the direction of the first axis, of the corner cutting edge of each of the cutting edge sections.

Next, a cutting insert 12 according to a fourth embodiment of the present invention will be described with reference to FIG. 7, and FIG. 8A to FIG. 8D. The cutting insert 12 according to the fourth embodiment also basically has a similar configuration to the cutting insert 1 according to the first embodiment, and only different constituent elements will be described below. Furthermore, similar terms and reference signs are used for the configurations (elements) of the cutting insert 12 similar to those of the cutting insert 1 according to the first embodiment.

The cutting insert 12 according to this fourth embodiment differs from the cutting insert according to the first embodiment in an area of the cutting edge section formed on the intersecting ridgeline portion between the upper surface 2 and the peripheral side surface 4, or on the intersecting ridgeline portion between the lower surface 3 and the peripheral side surface 4. More specifically, the cutting insert 12 largely differs from the cutting insert 1 according to the first embodiment in the area where the minor cutting edge 8, which is connected with the corner cutting edge 6 at the corner A, B, E or F, is formed, and also in that a corner cutting edge 6B is also formed at the corner C, D, G or H. The minor cutting edge 8 is formed continuously from the corner A, B, E or F on one side to an end portion of the corner area at the corner C, D, G or H on the other side without discontinuation. In other words, the minor cutting edge 8 is formed in a protruding manner up to the end portion of the corner area at the corner C, D, G or H on the other side. Furthermore, unlike the cutting insert 1 according to the first embodiment, the corner cutting edges (second corner cutting edges) 6B each of which protrudes are formed at the corner C and D on the upper surface 2 and at the corner G and H on the lower surface 3. As described above, in the cutting insert 12 according to this embodiment, the corner cutting edges 6, 6B are formed at all the corners on the upper and lower surfaces 2 and 3, and the portion having no cutting edge formed thereon is located only on a part of four intersecting ridgeline portions (intersecting ridgeline portions between the first side surface portion 4a and each of the upper and lower surfaces 2 and 3) where the major cutting edge 7 is partially formed on each of the upper and lower surfaces 2 and 3.

Thus, one non-cutting intersecting ridgeline portion is located adjacent only to a part of the major cutting edge of one associating cutting edge section. Here, attention is paid to one corner B on the upper surface 2. A line α that is in parallel to the axis 5a is drawn in FIG. 8B so as to pass through one point p located on the major cutting edge and spaced apart from the corner cutting edge 6 of the cutting edge section 2B associated with the corner B. Similarly, a line β that is in parallel to the axis 5a is drawn in FIG. 8B so as to pass through a point q (a point located closer to the corner cutting edge than the point p) located at an end portion of the corner cutting edge 6 of the cutting edge section 2B on the major cutting edge side. The line α, which passes through the point p, reaches an end portion r of the non-cutting intersecting ridgeline area 3D extending in the vicinity of the corner H on the lower surface 3 in FIG. 8B. Furthermore, the line β, which passes through the point q, reaches another end portion s of the non-cutting intersecting ridgeline area 3D extending in the vicinity of the corner H on the lower surface 3 in FIG. 8B. The same applies to other cutting edge sections. Thus, in the cutting insert 12, a part of the major cutting edge of one cutting edge section on either one of the upper and lower surfaces extends on the back (in the direction of the axis 5a) of one non-cutting intersecting ridgeline area on the other one of the upper and lower surfaces.

As described above, in the cutting insert 12 according to this fourth embodiment, the major cutting edge 7 extends along a part of the intersecting ridgeline portion between the first side surface portion 4a of the peripheral side surface 4 and each of the upper and lower surfaces 2 and 3, and the minor cutting edge 8 extends substantially throughout the entire intersecting ridgeline portion between the second side surface portion 4b of the peripheral side surface 4 and each of the upper and lower surfaces 2 and 3. Furthermore, each of the cutting edge sections includes the second corner cutting edge 6B that is connected with the minor cutting edge 8, in addition to the corner cutting edge 6 serving as a first corner cutting edge. Thus, in the cutting insert 12, the non-cutting intersecting ridgeline portion 9a, 9b, 9c, 9d and the non-cutting intersecting ridgeline area 2A, 2B, 3C, 3D are located only on the back, in the direction of the first axis, of a part of the major cutting edge of each of the cutting edge sections.

What is more important in the cutting inserts 1, 10, 11, 12 according to the first to fourth embodiments of the present invention described above is that, in the cutting insert having the cutting edges formed on both of the upper surface 2 and the lower surface 3, at least one portion having no cutting edge formed thereon so as to protrude from the seating surface 9, in other words, the non-cutting intersecting ridgeline portion (non-cutting intersecting ridgeline area) is provided on the intersecting ridgeline portion located on either one of the upper surface 2 and the lower surface 3 and located adjacent, in the insert thickness direction, to either or both of the corner cutting edge 6 and the major cutting edge 7 formed on the intersecting ridgeline portion between the peripheral side surface 4 and the other one of the upper surface 2 and the lower surface 3. In other words, in the double-sided cutting insert, at least one intersecting ridgeline portion on which no cutting edge is formed is provided immediately below (or on the back of) either one or both of the corner cutting edge 6 and the major cutting edge 7 formed on the upper surface 2 and the lower surface 3. The shape of each of the upper surface 2 and the lower surface 3 is not limited to the substantially quadrilateral shape, provided that the configuration described above is employed. For example, it may be possible to apply the present invention to a cutting insert having an end surface with other substantially polygonal shape such as a substantially triangular shape and substantially pentagonal shape. Note that, in the first to fourth embodiments, the non-cutting intersecting ridgeline area is located on the same plane as the seating surface 9. However, the non-cutting intersecting ridgeline area is not limited to be located on the same plane as the seating surface 9, and may have various shapes. Preferably, the non-cutting intersecting ridgeline area is configured so as to function as a part of the seating surface 9.

Preferably, the cutting insert according to the present invention is formed of a hard material such as a cemented carbide, cermet, ceramic, and an ultrahigh-pressure sintered body containing diamond or cubic boron nitride, or a hard material obtained by subjecting these materials to coating.

Figure 13A:
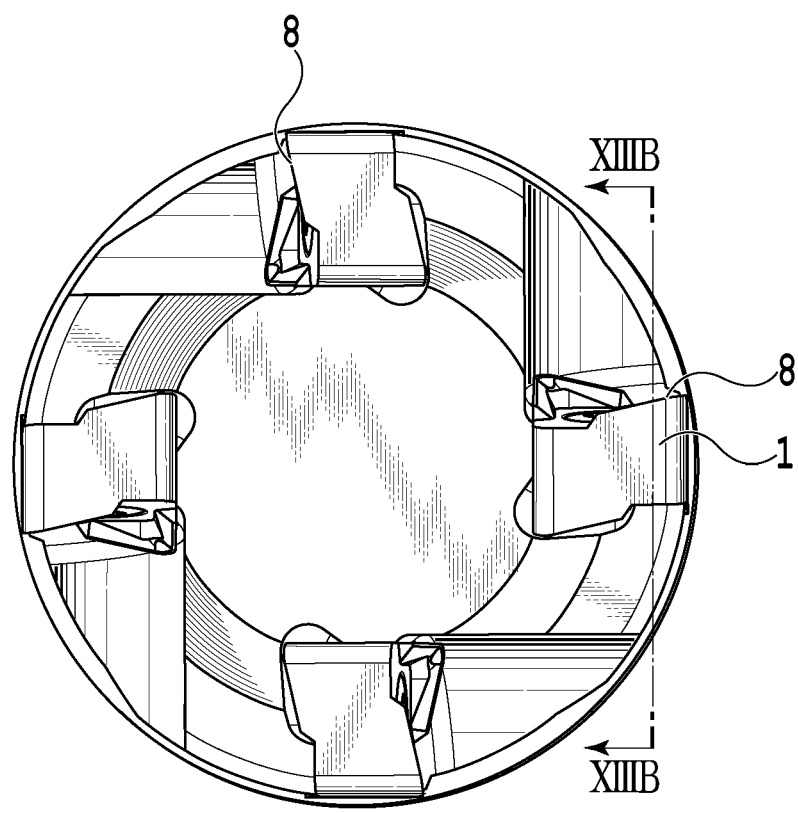
FIG. 13A is a bottom view illustrating the leading end side of the indexable rotary cutting tool in FIG. 9.
Figure 13B:
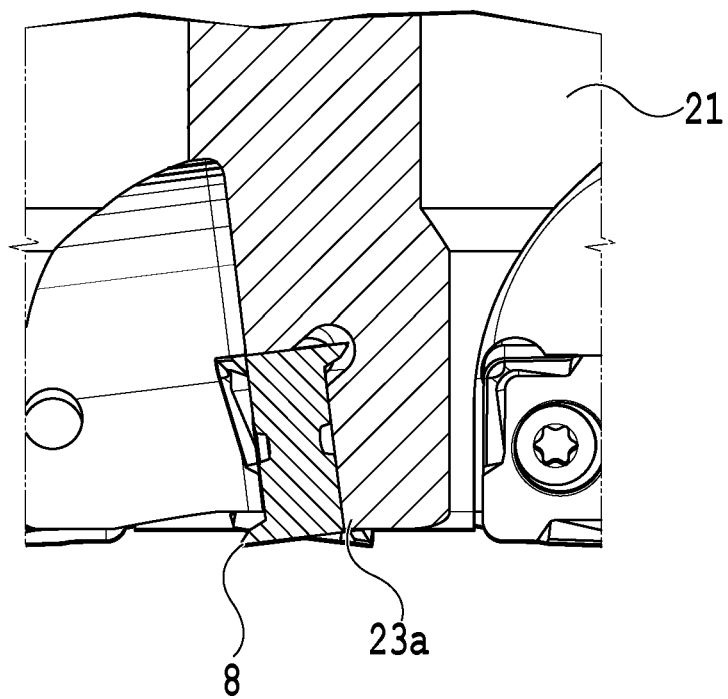
FIG. 13B is a sectional view illustrating part of the indexable rotary cutting tool in FIG. 9 taken along the line XIIIB-XIIIB in FIG. 13A.
Figure 14:
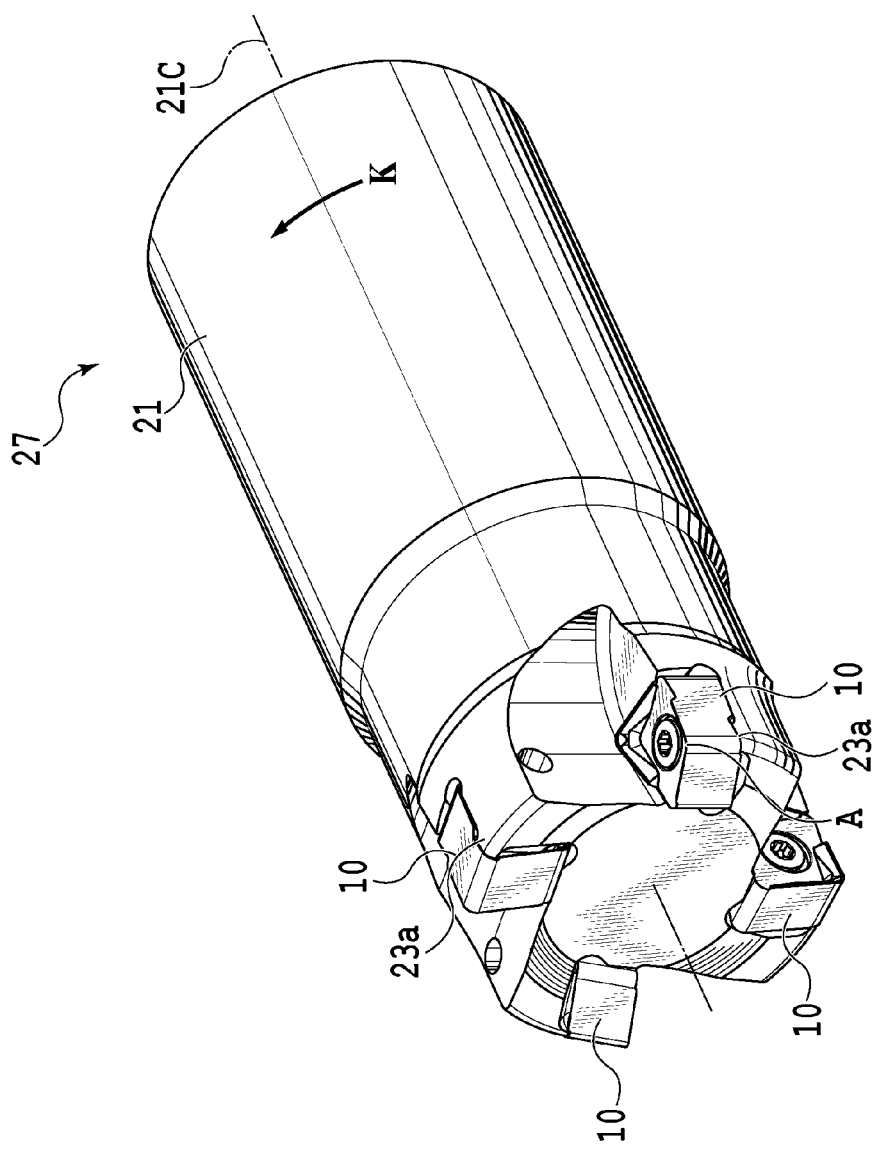
FIG. 14 is a perspective view illustrating an indexable rotary cutting tool according to a second embodiment having the cutting insert according to the second embodiment mounted thereon.
Figure 15:
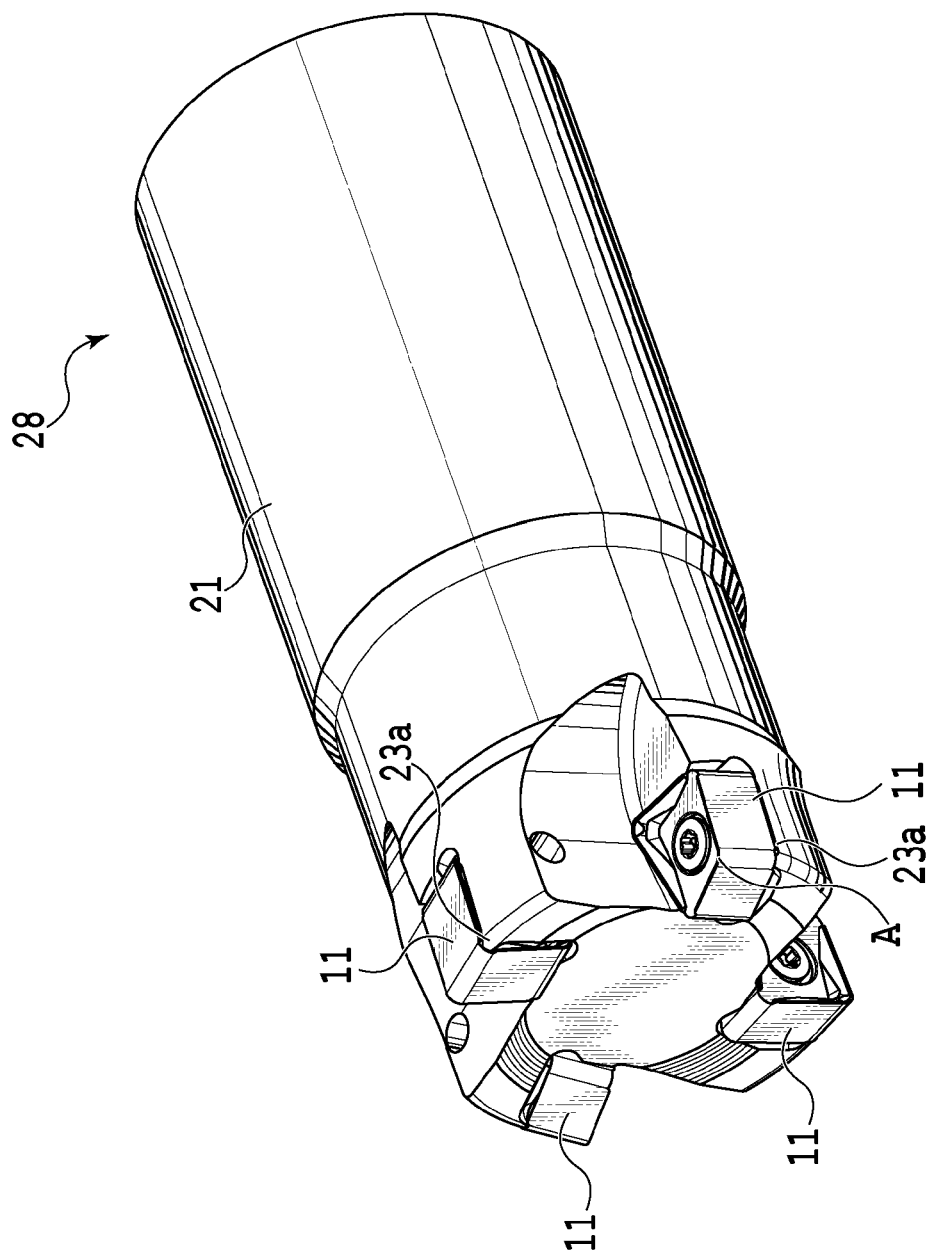
FIG. 15 is a perspective view illustrating an indexable rotary cutting tool according to a third embodiment having the cutting insert according to the third embodiment mounted thereon.
Figure 16:
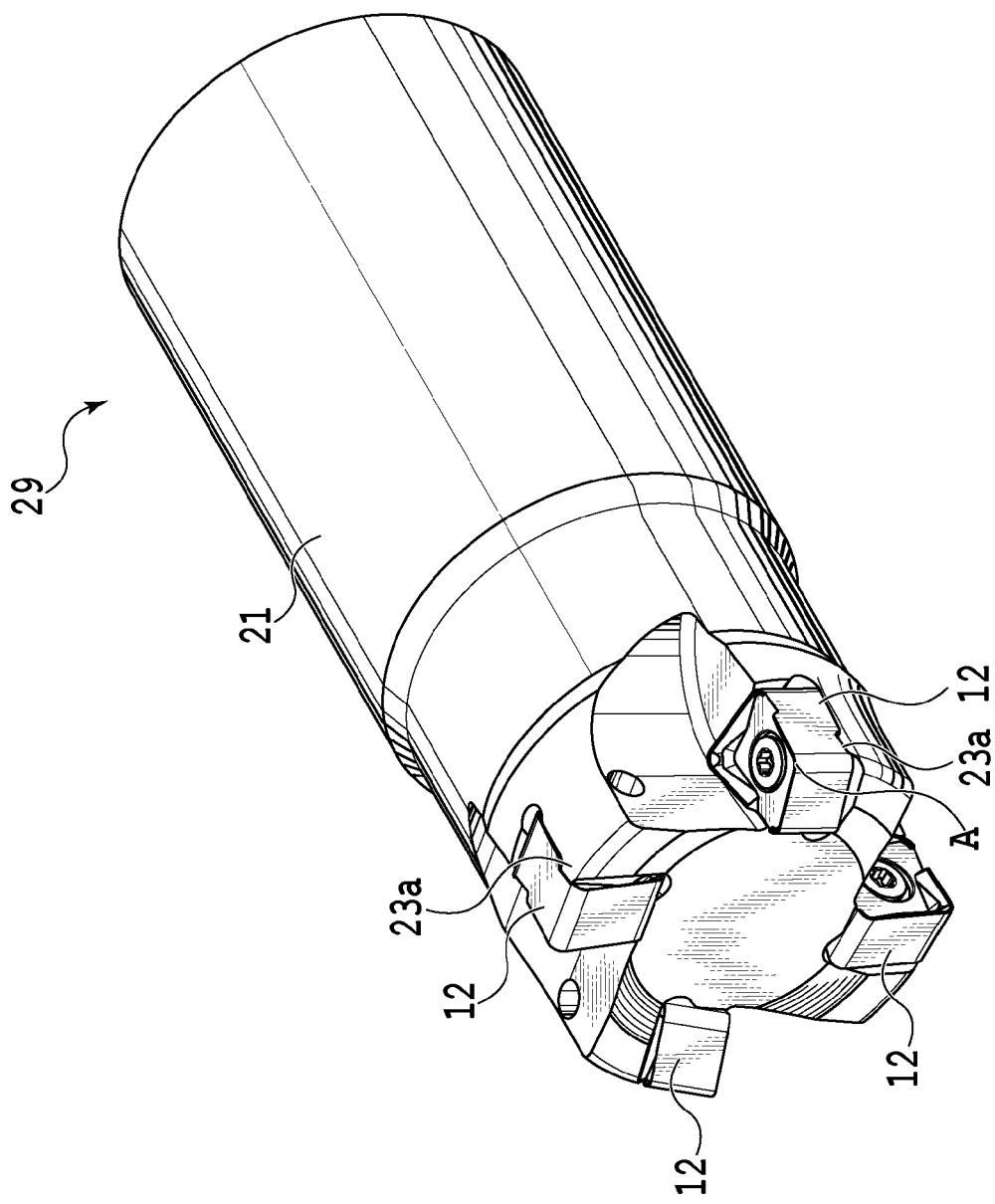
FIG. 16 is a perspective view illustrating an indexable rotary cutting tool according to a fourth embodiment having the cutting insert according to the fourth embodiment mounted thereon.
Figure 17A:
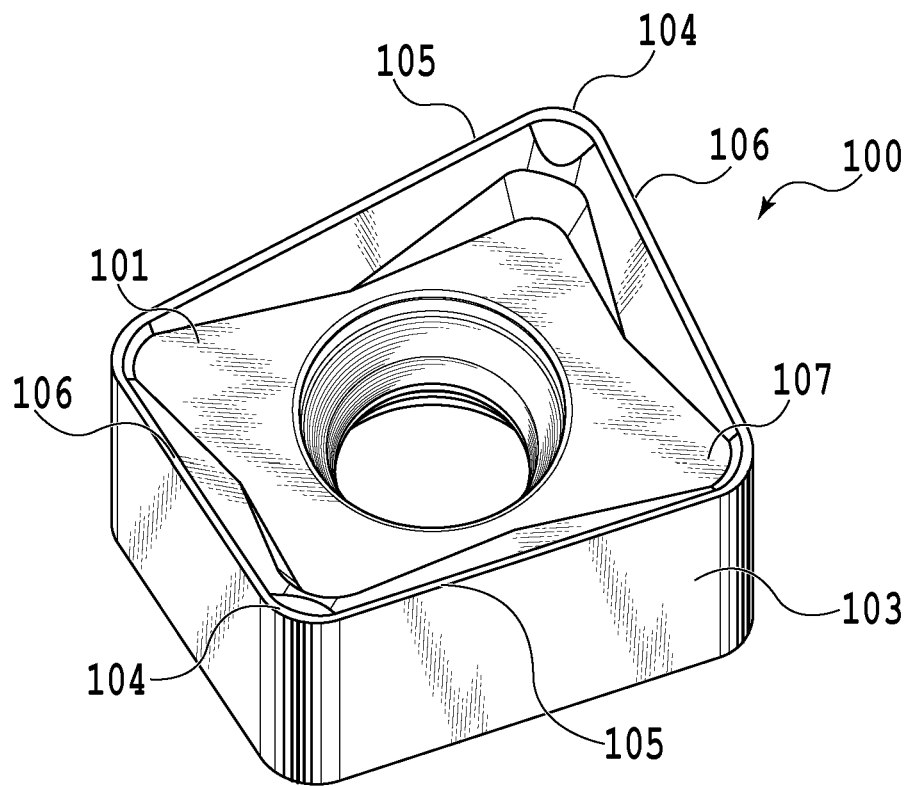
FIG. 17A is a perspective view illustrating a cutting insert as a comparative example.
Figure 17B:
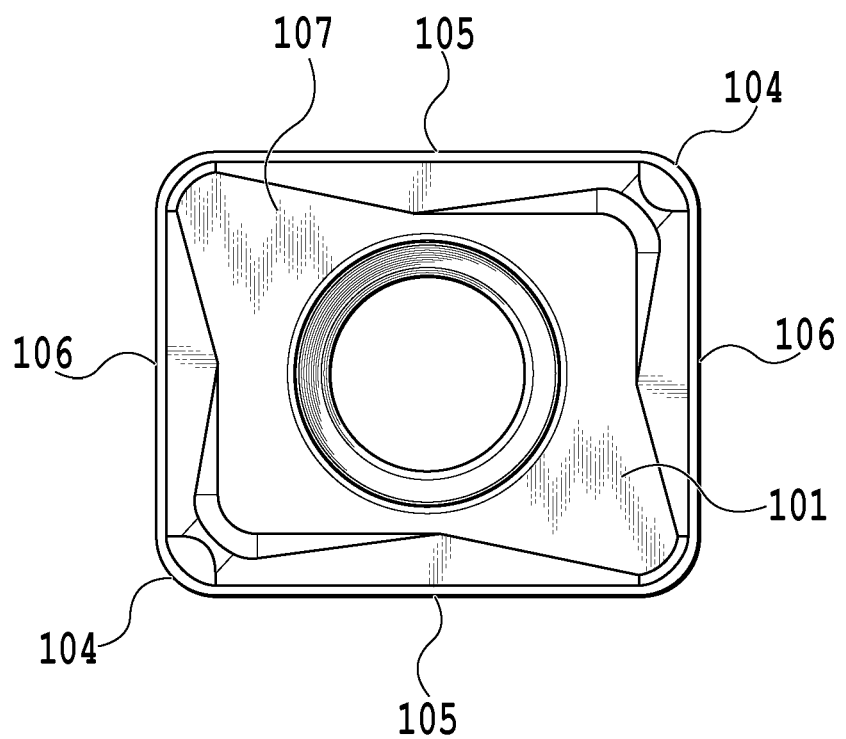
FIG. 17B is a plan view illustrating the cutting insert in FIG. 17A.
Figure 17C:
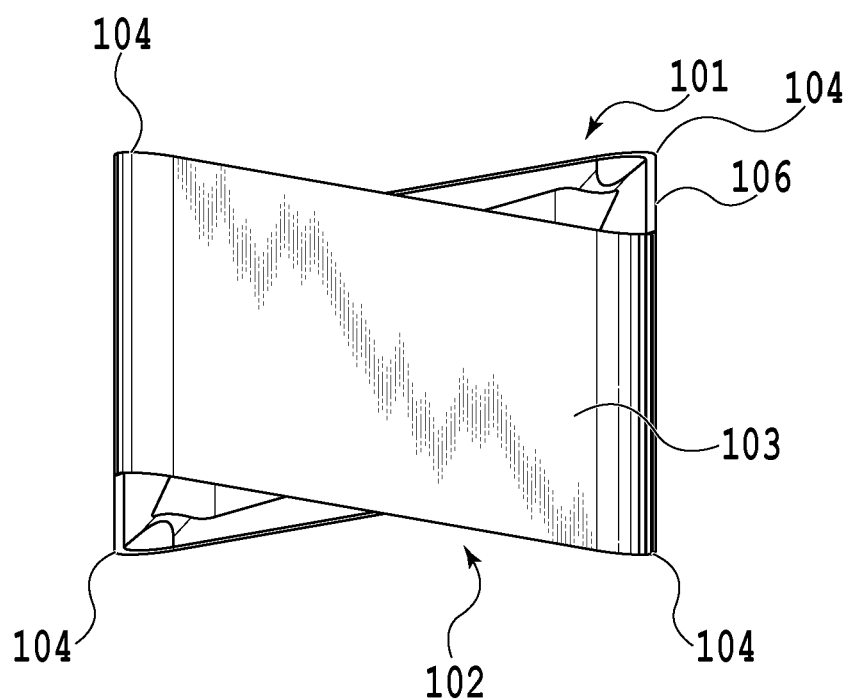
FIG. 17C is an elevation view illustrating the cutting insert in FIG. 17A.
Figure 17D:
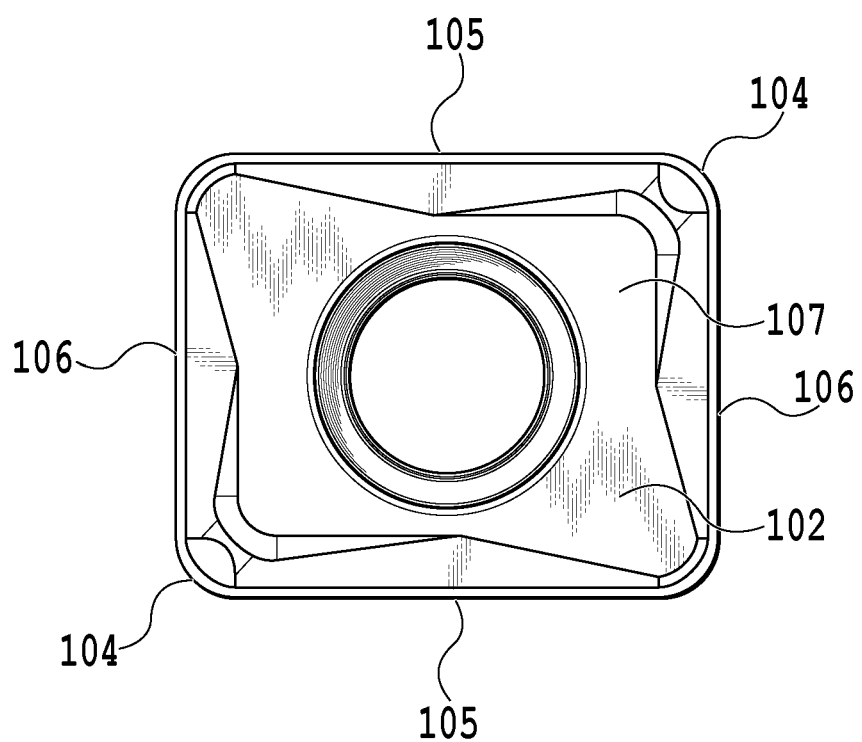
FIG. 17D is a bottom view illustrating the cutting insert in FIG. 17A.
Figure 18:
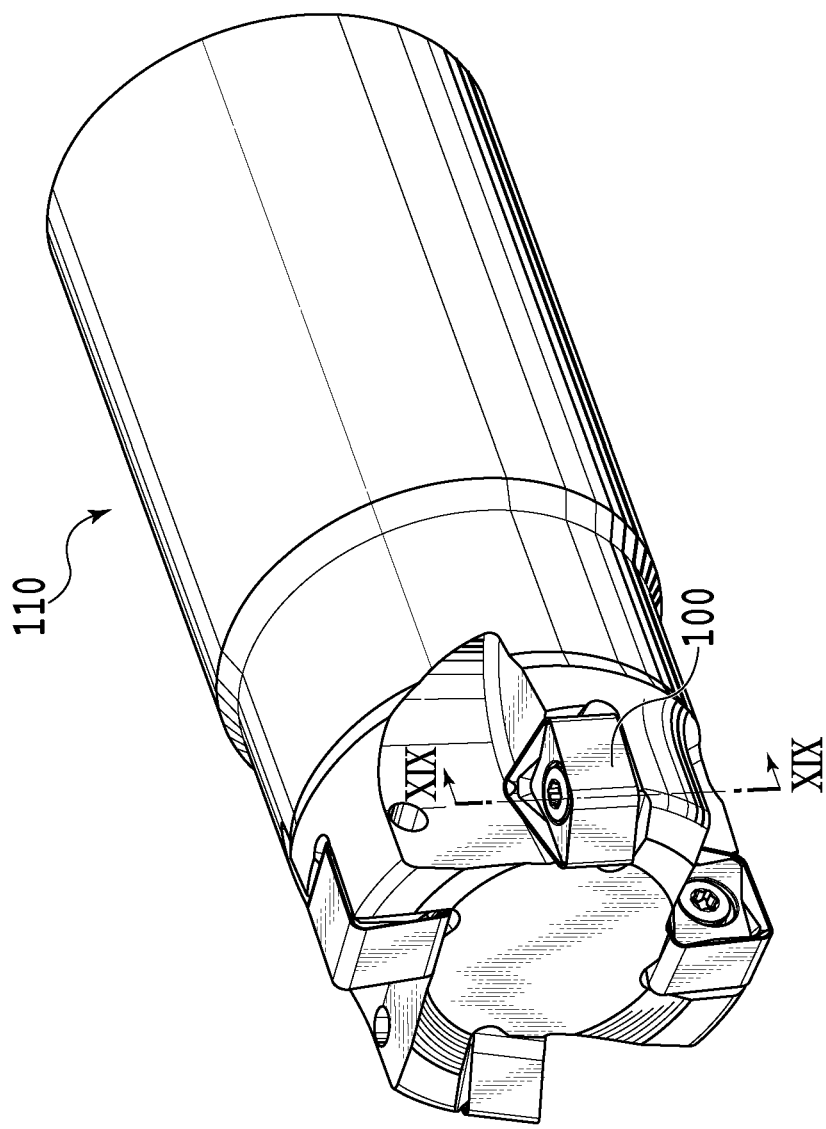
FIG. 18 illustrates an indexable rotary cutting tool as a comparative example, having the cutting insert in FIG. 17A mounted thereon.
Figure 19:
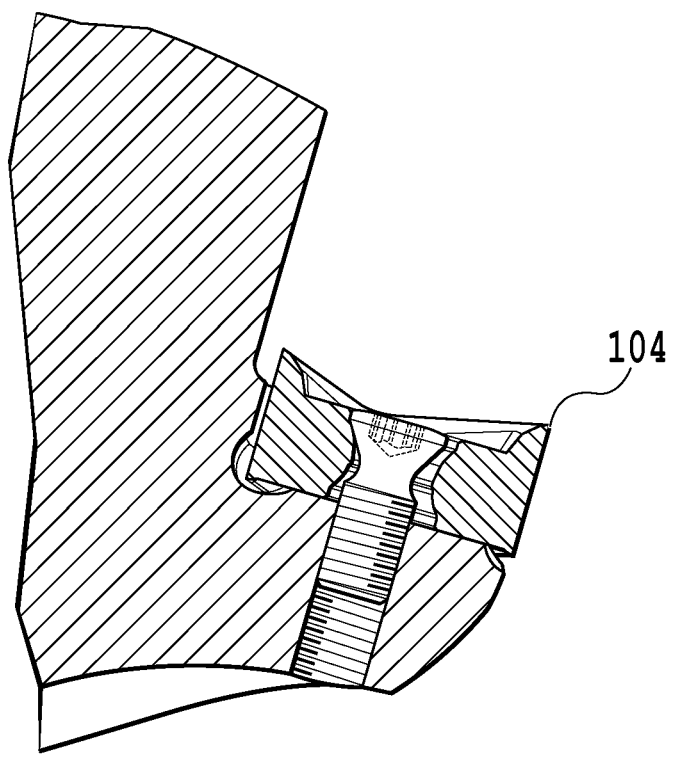
FIG. 19 is a sectional view illustrating part of the indexable rotary cutting tool in FIG. 18 taken along the line XIX-XIX.
Figure 20A:
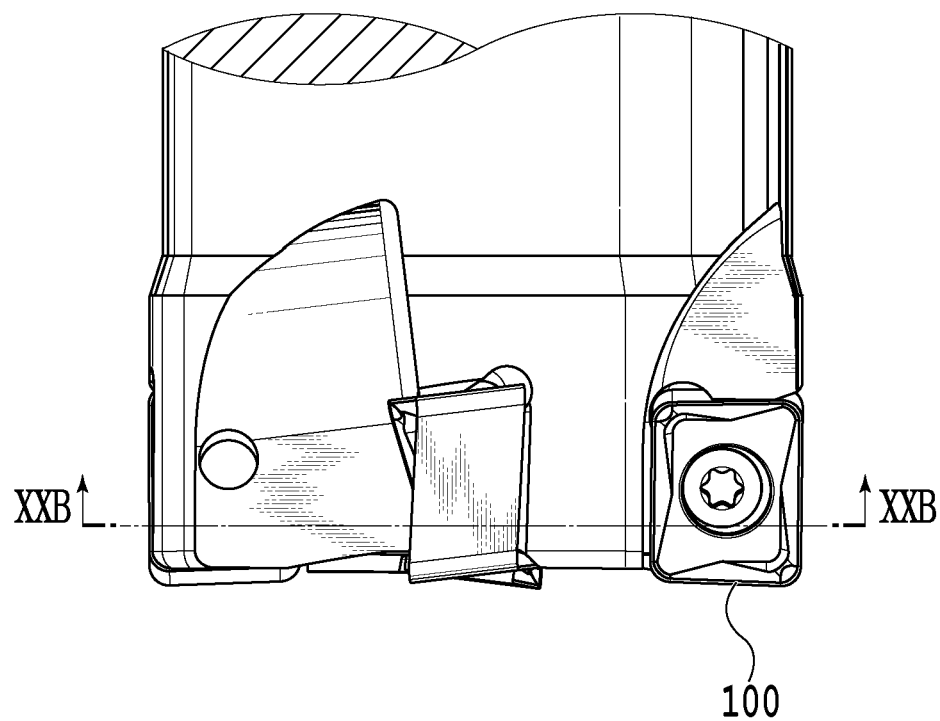
FIG. 20A is an elevation view illustrating a leading end side of the indexable rotary cutting tool in FIG. 18.
Figure 20B:
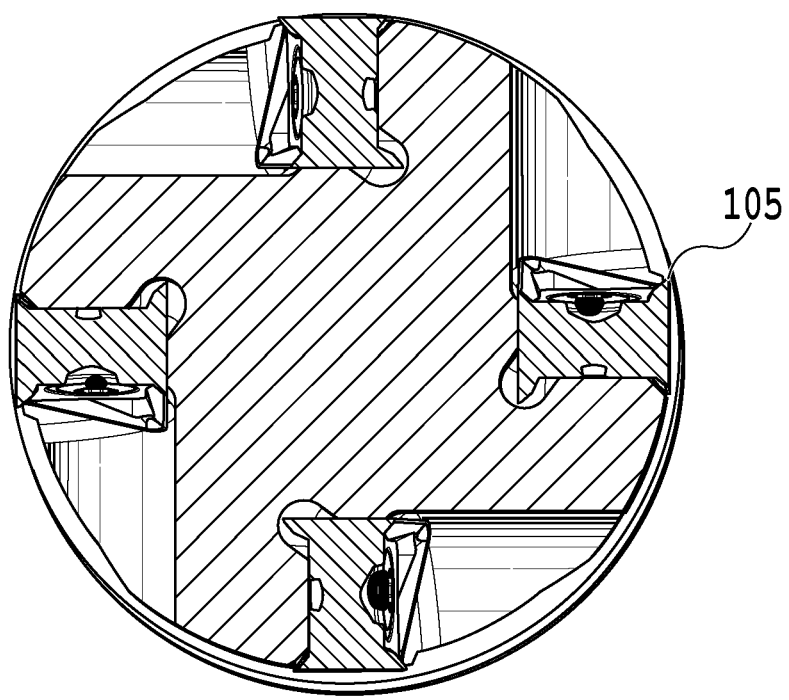
FIG. 20B is a sectional view illustrating the indexable rotary cutting tool in FIG. 20A taken along the line XXB-XXB.
Figure 21A:
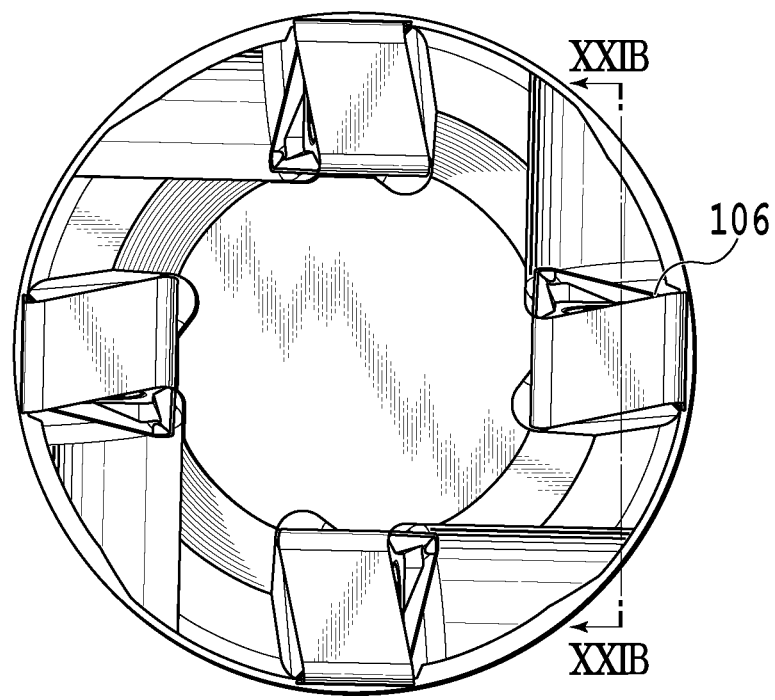
FIG. 21A is a bottom view illustrating the indexable rotary cutting tool in FIG. 18.
Figure 21B:
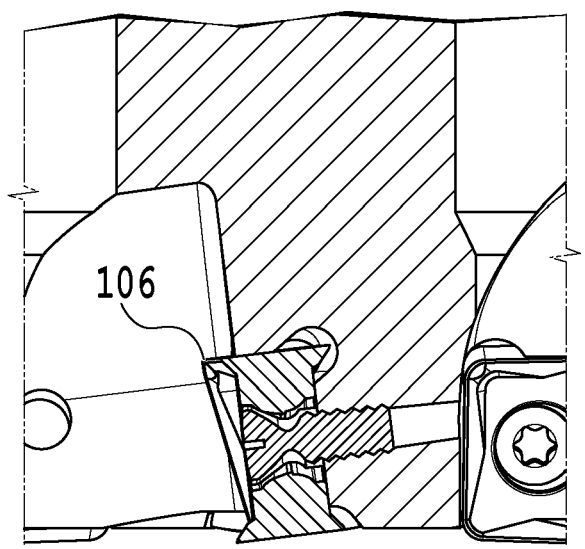
FIG. 21B is a sectional view illustrating part of the indexable rotary cutting tool in FIG. 21A taken along the line XXIB-XXIB.

Next, indexable rotary cutting tools according to embodiments of the present invention will be described. An indexable rotary cutting tool 20 according to the first embodiment that has the cutting insert 1 according to the first embodiment described above detachably mounted thereon will be described with reference to FIG. 9 to FIG. 13B. Furthermore, FIG. 14 illustrates an indexable rotary cutting tool 27 according to the second embodiment that has the cutting insert 10 according to the second embodiment detachably mounted thereon; FIG. 15 illustrates an indexable rotary cutting tool 28 according to the third embodiment that has the cutting insert 11 according to the third embodiment detachably mounted thereon; and FIG. 16 illustrates an indexable rotary cutting tool 29 according to the fourth embodiment that has the cutting insert 12 according to the fourth embodiment detachably mounted thereon.

The indexable rotary cutting tool 20 includes the tool body 21, and plural cutting inserts 1 according to the first embodiment, more specifically, four cutting inserts 1 are attached to the tool body 21. The tool body 21 has a substantially cylindrical shape as a whole, and has a rotational axis 21C extending from a leading end side 21A to a base end side 21B of the tool body 21. A leading end surface of the tool body 21 includes plural, more specifically, four insert seats 22 provided so as to be cut out from the outer peripheral side thereof. The insert seats 22 are each basically configured to include a bottom wall surface 23 having a substantially quadrilateral shape and facing the front direction in a tool rotational direction K, and two side wall surfaces 24a and 24b disposed so as to be substantially at a right angle to the bottom wall surface 23. An attachment-screw hole 25 for inserting a fixing screw thereinto is inserted is provided substantially at the center portion of the bottom wall surface 23. However, although, here, the cutting insert is fixed to the insert seat using the screw, the cutting insert may be fixed with mechanical means other than that described above. In such a case, it may be possible to omit the through-hole 5 and the attachment-screw hole 25. A recess portion is provided (see FIG. 10) at a peripheral edge portion of the bottom wall surface 23 in order to prevent the bottom wall surface 23 of the insert seat 22 from being brought into contact with the cutting edges that protrudes in the direction of the axis 5a as compared with the seating surface 9 on the upper surface 2 or the lower surface 3 when the cutting insert 1 is mounted on the insert seat 22. A supporting abutment portion 23a having a shape suitable for the non-cutting intersecting ridgeline portion and the non-cutting intersecting ridgeline area of the cutting insert 1 is formed at each edge portion of the bottom wall surface 23 of the tool body 21 on the leading end side and the outer peripheral side and their vicinities. This supporting abutment portion 23a may be configured so as to be clearly distinguished from other portions of the bottom wall surface 23. However, here, the supporting abutment portion 23a integrally fuses with other portions of the bottom wall surface 23.

Furthermore, in this embodiment, the insert seats 22 are arranged at four points set so as to equally divide the outer periphery of the tool body 21 into four portions. However, arrangement is not limited to this. In other words, the number of insert seats 22 may be, for example, one, two, three, or five, in other words, may be less than four or more than four. The plural insert seats 22 may be arranged at positions set so as to unequally divide the outer periphery. A chip pocket 26 for discharging chips is disposed on the forward side of each of the insert seats 22 in the tool rotational direction K.

The cutting insert 1 according to the first embodiment is mounted on the insert seat 22 so that the upper surface 2 or the lower surface 3 of this cutting insert 1 faces the bottom wall surface 23 of the insert seat 22. In other words, in the case where the cutting edge formed on the upper surface 2 is used for a cutting work, the cutting insert is mounted so that the lower surface 3 faces the bottom wall surface 23. On the other hand, in the case where the cutting edge formed on the lower surface 3 is used for a cutting work, the cutting insert is mounted so that the upper surface 2 faces the bottom wall surface 23. Since the insert seat 22 employs a structure in which the protruding cutting edge is not brought into contact with the insert seat 22 as described above, it is possible to eliminate a possibility that a cutting edge, which is not in use, in particular, an unused cutting edge is damaged due to contact of the cutting edge with the insert seat 22.

Naturally, in the case of each of the rotary cutting tools 27, 28, and 29 that have the cutting inserts 10, 11, and 12 according to the second to fourth embodiments mounted thereon, the bottom wall surface 23 of each of the insert seats 22 is shaped so as to fit the seating surface 9 of the cutting insert 10, 11, 12 according to each of the embodiments. In each of the rotary cutting tools according to the second to fourth embodiments, the supporting abutment portion 23a having a shape suitable for the non-cutting intersecting ridgeline portion and the non-cutting intersecting ridgeline area of the cutting insert is formed at each edge portion of the bottom wall surface 23 of the tool body 21 on the leading end side and/or the outer peripheral side, and their vicinities. In each of the rotary cutting tools according to the second to fourth embodiments, this supporting abutment portion 23a may also be configured so as to be clearly distinguished from other portions of the bottom wall surface 23. However, here, the supporting abutment portion 23a integrally fuses with other portions of the bottom wall surface 23. Furthermore, the insert seat of each of the rotary cutting tools according to the second to fourth embodiments also includes a recess portion in order to prevent interference of the insert seat with cutting edges that are not in use, and protect them. Thus, it is possible to eliminate a possibility that the cutting edge that is not in use comes into collision with the insert seat, or interferes with the insert seat.

Hereinafter, operation and effect of the cutting insert 1, 10, 11, 12 according to the present invention and the indexable rotary cutting tool 21, 27, 28, 29 that has the cutting insert mounted thereon will be described.

First, a cutting insert 100 and a cutting tool 110 will be described with reference to FIG. 17A to FIG. 21B as a comparative example to the embodiments. Note that the cutting insert located on the back of the paper is omitted in FIG. 21B. The cutting insert 100 is basically configured to include an upper surface 101 and a lower surface 102, each of which has a substantially quadrilateral shape, and a peripheral side surface 103 that connects these surfaces. On the upper surface 101, a corner cutting edge 104 is formed at each of paired corners located on a diagonal line; a major cutting edge 105 is formed on a longer ridgeline portion that extends from a corner; and an minor cutting edge 106 is formed on a shorter ridgeline portion that extends from a corner in a direction different from the longer ridgeline portion. Similarly, on the lower surface 102, the corner cutting edges 104, the major cutting edges 105, and the minor cutting edges 106 are formed. Furthermore, in the cutting insert 100, four corner cutting edges are disposed on the upper and lower surfaces so that a diagonal line connecting the corner cutting edges 104 diagonally located on the lower surface 102 intersects with a diagonal line connecting the corner cutting edges 104 located on the upper surface 101. Thus, in this cutting insert 100, four corners that can be separately used in cutting are disposed so that corner cutting edges on the upper surface are not aligned with corner cutting edges on the lower surface in the thickness direction of the cutting insert 100.

Furthermore, as illustrated in FIG. 17A to FIG. 17D, in the cutting insert 100, a seating surface 107 is formed in the vicinity of the central portion of each of the upper surface 101 and the lower surface 102 that are to be brought into contact with the bottom wall surface of the insert seat, and the entire seating surface 107 is disposed so as to be spaced apart from the edge portion of each of the surfaces. Thus, in this cutting insert 100, the seating surface 107, which is to be brought into contact with the bottom wall surface of the insert seat, is disposed on the inner side of the insert so as to be spaced apart from the intersecting ridgeline portion between the peripheral side surface 103 and the upper surface 101 or the lower surface 102, and hence, this cutting insert 100 is supported by the bottom wall surface of the insert seat only at a central portion in the vicinity of the mounting hole of the upper and lower surfaces. Thus, as illustrated in each of the sectional views in FIG. 19, FIG. 20B, and FIG. 21B, since the cutting insert is supported by the bottom wall surface of the insert seat only at a central portion in the vicinity of the mounting hole of the cutting insert, there is a possibility that the cutting insert 100 and the cutting tool 110 have a problem of chattering or chipping due to swaying of the cutting edge when a large force acts on the cutting edge.

On the other hand, according to the cutting insert 1, 10, 11, 12 of the present invention, at least one portion having no cutting edge formed thereon, in other words, at least one non-cutting intersecting ridgeline portion is formed on the intersecting ridgeline portion located on either one of the upper surface 2 and the lower surface 3 and adjacent, in the insert thickness direction, to either one of or both of the corner cutting edge 6 and the major cutting edge 7 formed on the intersecting ridgeline portion on the other one of the upper surface 2 and the lower surface 3, as described above. Furthermore, this non-cutting intersecting ridgeline portion is formed between the seating surface 9 and the peripheral side surface 4. With this configuration, it is possible to reliably support the cutting insert with the insert seat immediately below the corner cutting edge 6 or the major cutting edge 7 that carries a large load during cutting work. Thus, it is possible to effectively bear a cutting force acting on the entire cutting edge. This makes it possible to enhance a securing property of the cutting insert, and significantly reduce swaying of the cutting edge due to a cutting force acting thereon. As a result, it is possible to significantly reduce occurrence of chattering or chipping, whereby it is possible to obtain an effect of improvement in tool life of the cutting insert or improvement in quality of machined surfaces of a work piece.

A further unique effect can be obtained according to an area where a non-cutting intersecting ridgeline portion that is connected with the seating surface, of the intersecting ridgeline portion between the peripheral side surface 4 and the upper surface 2 or the lower surface 3 is formed. Described below are effects obtained by each of geometries of the cutting insert 1 according to the first embodiment to the cutting insert 12 according to the fourth embodiment.

Figure 9:
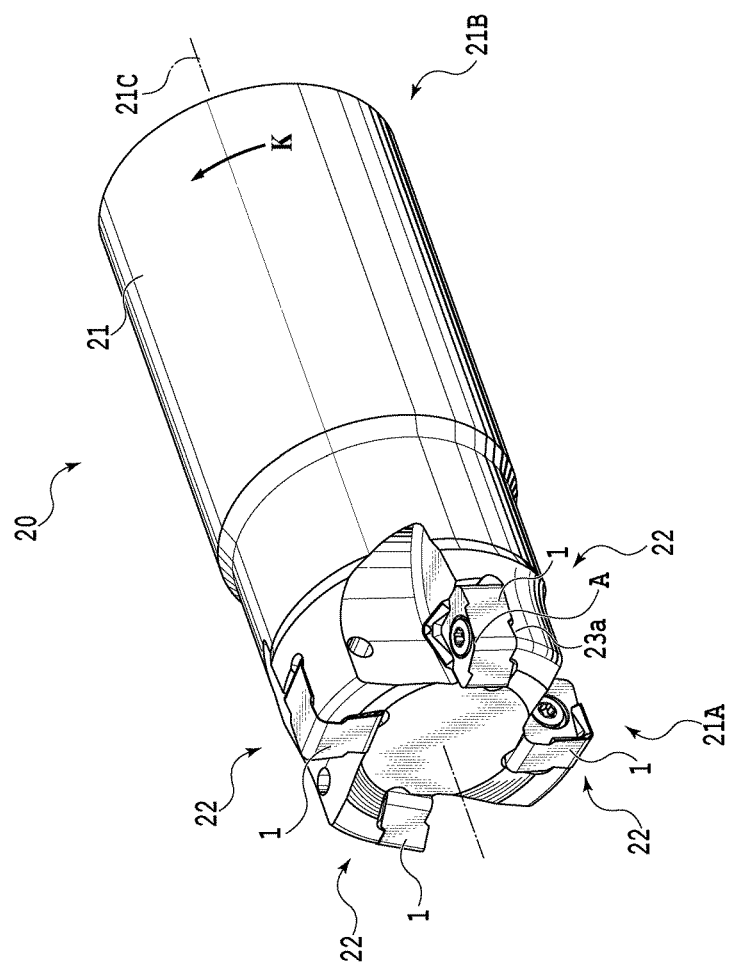
FIG. 9 is a perspective view illustrating an indexable rotary cutting tool according to the first embodiment having the cutting insert according to the first embodiment mounted thereon.
Figure 10:
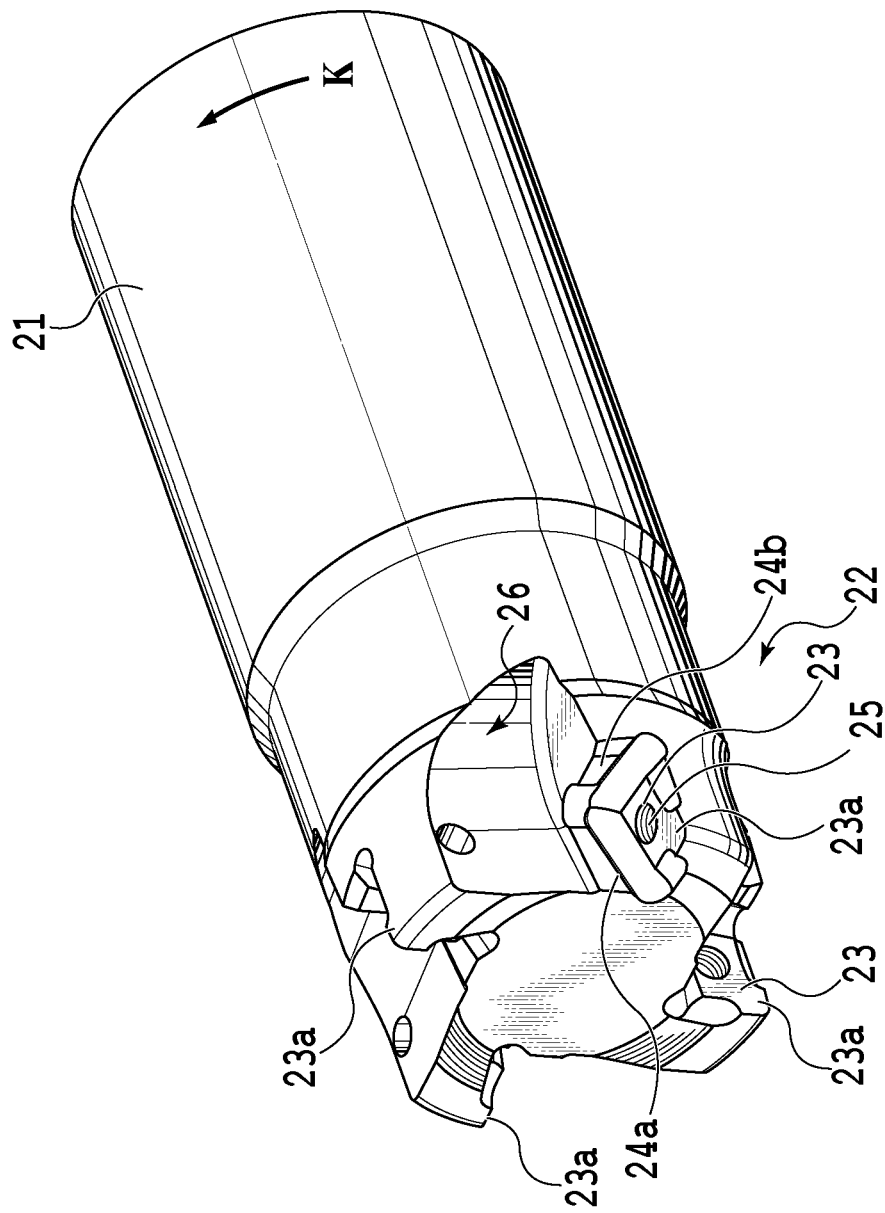
FIG. 10 is a perspective view illustrating a tool body of the indexable rotary cutting tool according to the first embodiment in FIG. 9.
Figure 11A:
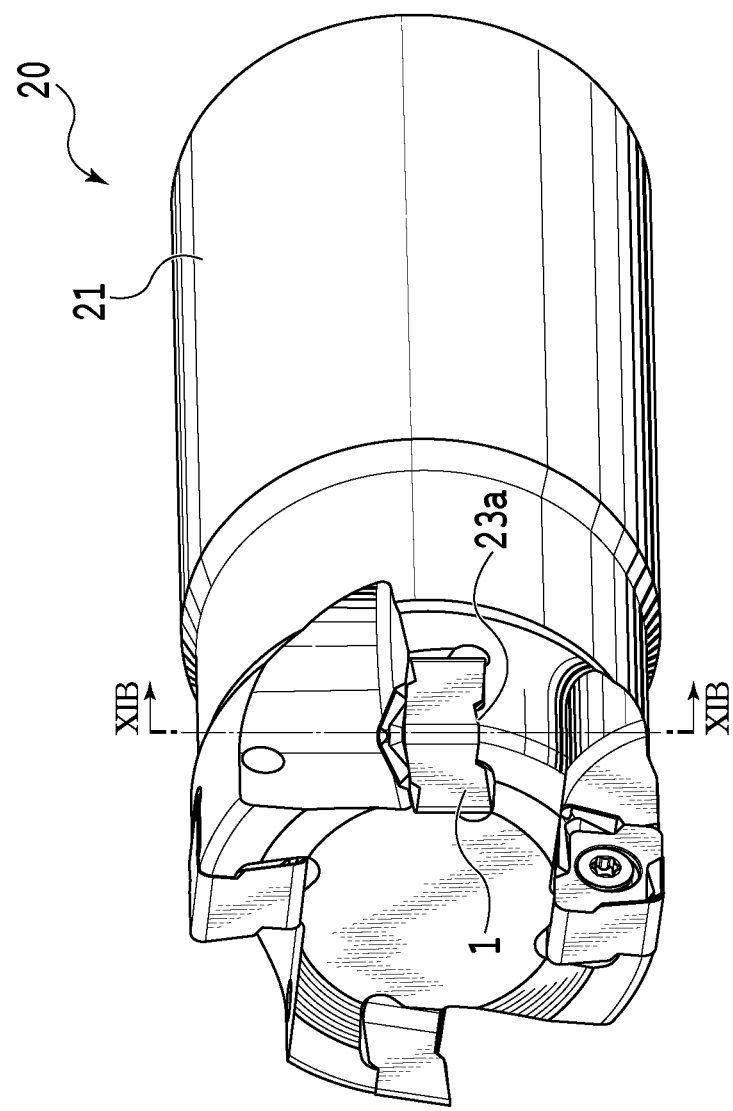
FIG. 11A is a perspective view illustrating the indexable rotary cutting tool in FIG. 9 when viewed from a different angle from that in FIG. 9.
Figure 11B:
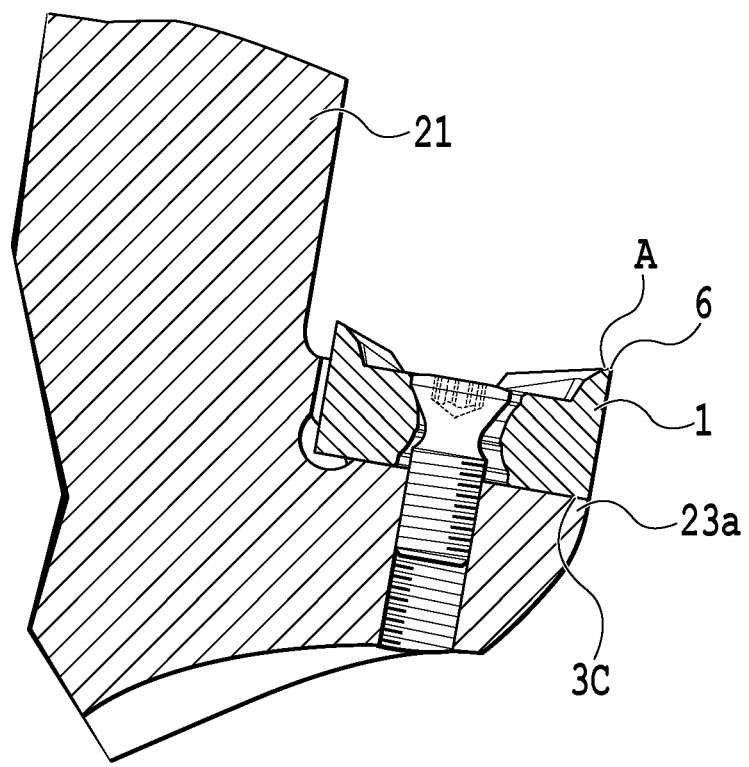
FIG. 11B is a sectional view illustrating part of the indexable rotary cutting tool in FIG. 9 taken along the line XIB-XIB in FIG. 11A.
Figure 12A:
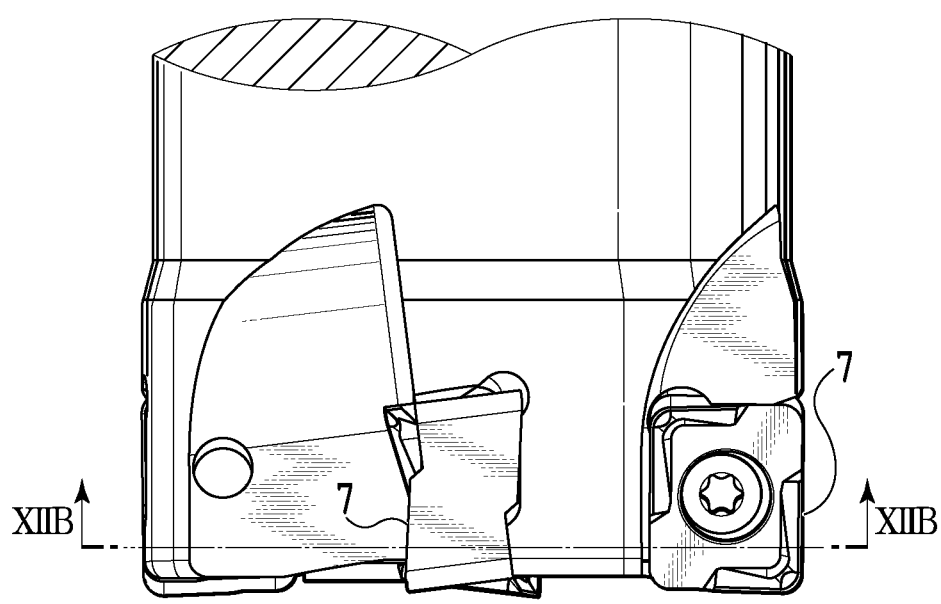
FIG. 12A is an elevation view illustrating a leading end side of the indexable rotary cutting tool in FIG. 9.
Figure 12B:
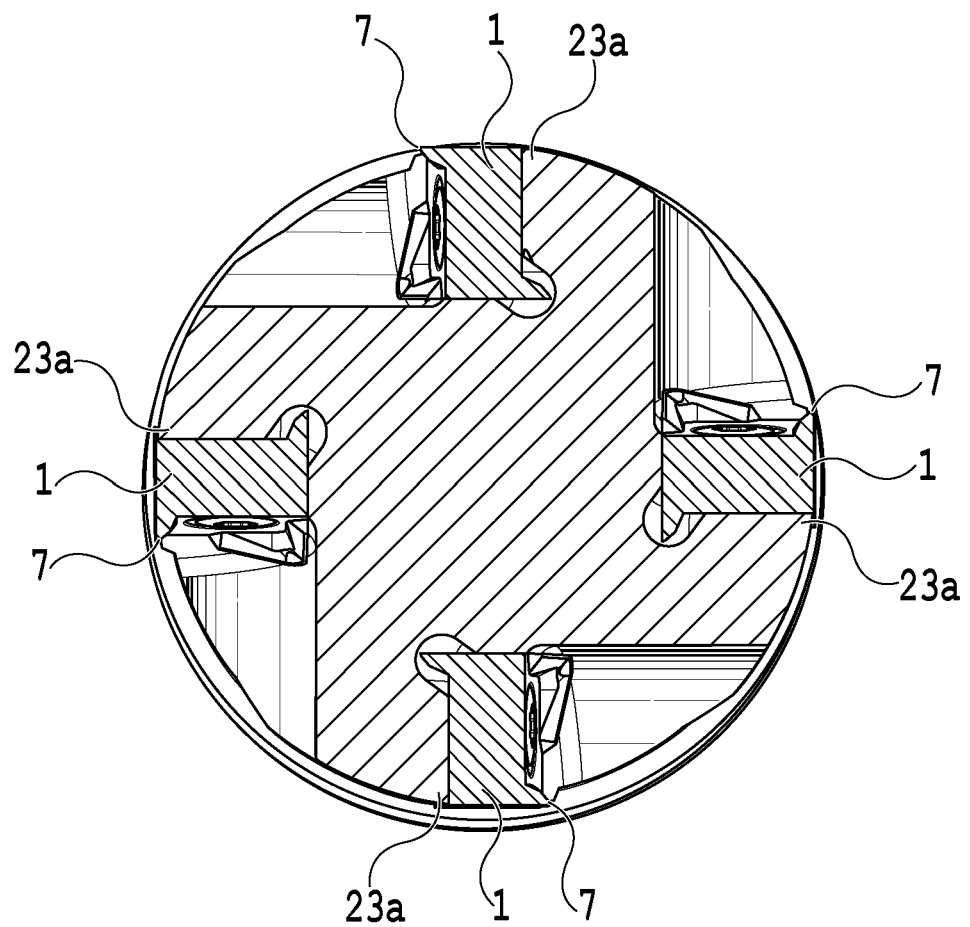
FIG. 12B is a sectional view illustrating the indexable rotary cutting tool in FIG. 9 taken along the line XIIB-XIIB in FIG. 12A.

As illustrated in FIG. 9 and FIG. 10, in the cutting insert 1 according to the first embodiment, when the corner A is involved in cutting work, the entire area of the corner G and a part of the intersecting ridgeline portion on each of the major cutting edge 7 side and the minor cutting edge 8 side connected with each end of the corner G, each of which is located immediately below the corner A, serves as a contacting surface portion, in other words, the non-cutting intersecting ridgeline area. The sectional view in FIG. 11B, which is taken along the line XIB-XIB in FIG. 11A, illustrates that the non-cutting intersecting ridgeline area 3C located immediately below the corner cutting edge 6 at the corner A is reliably supported by the supporting abutment portion 23a of the bottom wall surface 23 of the insert seat 22. Furthermore, the sectional view in FIG. 12B, which is taken along the line XIIB-XIIB in FIG. 12A, illustrates that the non-cutting intersecting ridgeline area located immediately below the major cutting edge 7 is reliably supported by the supporting abutment portion 23a of the bottom wall surface 23 of the insert seat 22. Furthermore, the sectional view in FIG. 13B, which is taken along the XIIIB-XIIIB in FIG. 13A, illustrates that the non-cutting intersecting ridgeline area located immediately below the minor cutting edge 8 is reliably supported by the supporting abutment portion 23a of the bottom wall surface 23 of the insert seat 22. As described above, the corner G and the non-cutting intersecting ridgeline area located in the vicinity of the corner G are formed integrally with the seating surface 9 so as to extend in such an area that covers a portion immediately below the cutting edge section (the corner cutting edge 6, the major cutting edge 7, and the minor cutting edge 8) that is involved in cutting work, whereby it is possible to reliably support the entire cutting edge from the back side thereof. In other words, in this first embodiment, the non-cutting intersecting ridgeline area on the back side of the insert, which corresponds to almost the entire area of the corner cutting edge 6, the major cutting edge 7, and the minor cutting edge 8 that bear a cutting force, serves as a contacting portion or a contacting area that is brought into abutment with the bottom wall surface 23 of the insert seat 22, whereby it is possible to maximize the effect described above.

Furthermore, here, description has been made of a case where the corner cutting edge provided at the corner A is used as the cutting corner. However, naturally, a similar effect can be obtained in a case where each of the cutting edge sections at other corners is used for cutting work. This applies to the second to fourth embodiments described below.

As illustrated in FIG. 14, in the cutting insert 10 according to the second embodiment, when the corner A is involved in cutting work, the entire area of the corner G and a part of the intersecting ridgeline portion between the lower surface 3 and the first side surface portion 4a connected with one end of the corner G, each of which is located immediately below the corner A, serves as the non-cutting intersecting ridgeline area. In other words, this second embodiment employs a configuration in which a cutting force acting on the corner cutting edge 6 and the major cutting edge 7 of the cutting edge involved in cutting work is mainly borne and supported by a portion immediately below them. Thus, the minor cutting edge 8 extends throughout the entire edge portion of the second side surface portion 4b, and is formed continuously from the corner A to the corner C. Usually, in the case where the corner cutting edge 6, the major cutting edge 7, and the minor cutting edge 8 are used as the cutting edge for milling operation, it is the corner cutting edge 6 and the major cutting edge 7 that receive a relatively strong cutting force as stress is more likely to concentrate on these edges. Thus, by employing a configuration that intensively supports a portion immediately below the corner cutting edge 6 and the major cutting edge 7, it is possible to sufficiently achieve an effect of reducing chattering or chipping of the cutting insert 10. On the other hand, the cutting insert according to this second embodiment has the minor cutting edge 7 longer than that in the cutting insert according to the first embodiment, and hence, can offer an advantage in which more efficient machining can be performed.

As illustrated in FIG. 15, in the cutting insert 11 according to the third embodiment, when the corner A is involved in cutting work, only the area of the corner G located immediately below the corner A serves as a contacting surface portion that is to be brought into contact with the insert seat, in other words, the non-cutting intersecting ridgeline area. Thus, the major cutting edge 7 and the minor cutting edge 8 extend throughout the entire length of the edge portion of the corresponding side surface portion 4a, 4b, and are continuously formed from the corner A to the corners D and C. The corner cutting edge 6 is located at the tip end portion, which is connected with both of the major cutting edge 7 and the minor cutting edge 8, and hence, the seating surface containing the non-cutting intersecting ridgeline portion, in other words, the non-cutting intersecting ridgeline area exists immediately below the corner cutting edge 6. This configuration significantly reduces the amount of overhang of a cutting edge in use from the seating surface in both directions of the major cutting edge 7 and the minor cutting edge 8, and only with this reduction, it is possible to sufficiently achieve the effect of significantly reducing chattering or chipping of the cutting insert 11. Furthermore, the cutting insert 11 according to this embodiment is configured such that the major cutting edge 6 and the minor cutting edge 7 each extend along the entire edge portion of the side surface portion, and hence, offers an advantage in which more efficient machining can be performed, as compared with the cutting inserts 1, 10 according to the first and second embodiments.

As illustrated in FIG. 16, in the cutting insert 12 according to the fourth embodiment, when the cutting edge at the corner A is involved in cutting work, only a part of the edge portion, that is, the intersecting ridgeline portion of the first side surface portion 4a connected with one end of the corner G immediately below the corner A serves as the non-cutting intersecting ridgeline portion. In other words, this fourth embodiment employs the configuration described above so as to be able to cause a portion immediately below the major cutting edge 7 to intensively bear a cutting force acting on the major cutting edge 7 of the cutting edge involved in the cutting work. Thus, the minor cutting edge 8 extends throughout the entire second side surface portion 4b, and is formed continuously from the corner A to the corner C. As described above, since the corner cutting edge 6 and the major cutting edge 7 are the portions that bear a strong cutting force, the non-cutting intersecting ridgeline area, in other words, the supporting abutment surface only exists immediately below the major cutting edge 7 to appropriately bear a large portion of the cutting force. Thus, it is possible to sufficiently achieve an effect of reducing chattering or chipping of the cutting insert 12. On the other hand, this embodiment has the minor cutting edge 8 extending throughout the entire edge portion of the second side surface portion 4b, and hence, can offer an advantage in which highly efficient machining can be performed as compared with the cutting insert 1 according to the first embodiment.

Furthermore, in each of the cutting inserts 1, 10, 11, and 12 according to the present invention, the cutting edges are each formed so as to protrude in the insert thickness direction with respect to the seating surface 9. Thus, it is possible to easily secure an increased rake angle, which makes it possible to significantly reduce a cutting force. Furthermore, no wall portion that strongly confines chips exists on the upper and lower surfaces, and hence, chips can be smoothly discharged, and furthermore, a cutting force can be reduced. By significantly reducing the cutting force as described above, it is possible to favorably prevent chattering or chipping of the cutting insert. Thus, according to the present invention, it is possible to obtain a synergistic effect between the chattering-reduction effect obtained with the cutting edge being formed so as to protrude from the seating surface 9, and the chattering-preventing effect obtained with the cutting edge being partially supported at least by a portion immediately below the cutting edge as described above, whereby it is possible to effectively achieve a significant effect of preventing chattering and chipping, as compared with the comparative example.

The cutting insert according to the present invention is applicable not only to a rotary cutting tool for milling operation (milling cutter or end mill) but also to a cutting tool for turning (tool bit) or a rotary cutting tool for drilling a hole (drill). In other words, the present invention can be used in any applications, provided that the target is a cutting insert that uses both the upper and lower surfaces for cutting work.

As above, these are descriptions of typical embodiments according to the present invention. However, the present invention is not limited to these embodiments, and various modifications are possible. Replacements and modifications are possible to the present invention without departing from the spirit and the scope of the present invention defined in claims of this application.

The invention claimed is:

1. A cutting insert comprising:
   two opposite end surfaces including a first end surface and a second end surface, each of them having an outline with a substantially polygonal shape;
   a peripheral side surface that extends between the first end surface and the second end surface; and
   a plurality of cutting edge sections that are formed along an intersecting ridgeline portion between the peripheral side surface and each of the first end surface and the second end surface, each of the cutting edge sections comprising:
      a corner cutting edge disposed at a corner portion;
      a major cutting edge connected with one end of the corner cutting edge; and
      a minor cutting edge connected with the other end of the corner cutting edge, wherein
   at least two cutting edge sections and a seating surface are formed on each of the first end surface and the second end surface,
   each of the cutting edge sections has a rake face on an adjacent end surface,
   at least a part of each of the cutting edge sections at least protrudes in an insert thickness direction,
   a non-cutting intersecting ridgeline area extending between adjacent cutting edge sections on either one of the first end surface and the second end surface is located adjacent, via the peripheral side surface, to at least a part of a portion including the corner cutting edge and the major cutting edge of an associating cutting edge section on the other one of the first end surface and the second end surface,
   the seating surface on each of the first end surface and the second end surface extends between adjacent cutting edge sections, to an intersecting ridgeline portion between the seating surface and the peripheral side surface in the non-cutting intersecting ridgeline areas.

2. The cutting insert according to claim 1, wherein
   the plurality of cutting edge sections are arranged and formed so as to be rotationally symmetrical with respect to a first axis that is set to extend in the insert thickness direction so as to penetrate the first end surface and the second end surface, and also are arranged and formed so as to be rotationally symmetrical with respect to a second axis that is set so as to intersect with the first axis at a right angle and pass through the peripheral side surface.

3. The cutting insert according to claim 1, wherein
   the non-cutting intersecting ridgeline area on either one of the first end surface and the second end surface is located adjacent, in the insert thickness direction, to a portion extending from a part of the major cutting edge through the corner cutting edge to a part of the minor cutting edge, of the cutting edge section on the other one of the first end surface and the second end surface.

4. The cutting insert according to claim 1, wherein
   the non-cutting intersecting ridgeline area on either one of the first end surface and the second end surface is located adjacent, in the insert thickness direction, to the corner cutting edge and a part of the major cutting edge of the cutting edge section on the other one of the first end surface and the second end surface.

5. The cutting insert according to claim 1, wherein
   the non-cutting intersecting ridgeline area on either one of the first end surface and the second end surface is located adjacent, in the insert thickness direction, only to the corner cutting edge of the cutting edge section on the other one of the first end surface and the second end surface.

6. The cutting insert according to claim 1, wherein
   each cutting edge section further comprises a second corner cutting edge different from the corner cutting edge and connected with the minor cutting edge, and
   the non-cutting intersecting ridgeline area on either one of the first end surface and the second end surface is located adjacent, in the insert thickness direction, only to a part of the major cutting edge of the cutting edge section on the other one of the first end surface and the second end surface.

7. An indexable cutting tool that comprises a tool body having at least one insert seat formed thereto, and a cutting insert in accordance with claim 1 detachably mounted on the insert seat, wherein:
   the insert seat includes a bottom wall surface that is brought into abutment with the seating surface of the cutting insert, and
   when the cutting insert is mounted on the insert seat in a way such that one cutting edge section on either one of the first end surface and the second end surface is used, the non-cutting intersecting ridgeline area adjacent to this cutting edge section and on the other one of the first end surface and the second end surface of the cutting insert is supported by the insert seat.

8. The indexable cutting tool according to claim 7, wherein
   the bottom wall surface of the insert seat comprises a portion that is capable of being brought into abutment with the non-cutting intersecting ridgeline area of the cutting insert.

9. An indexable cutting insert comprising:
   two opposite end surfaces including a first end surface and a second end surface, each end surface having an outline with four corners and a rectangular shape;
   a peripheral side surface that extends between the first end surface and the second end surface, the peripheral side surface comprising a pair of major first side surface portions connected to a pair of minor second side surface portions via four corner surface portions;
   a mounting hole passing between the first and second end surfaces;
   a plurality of cutting edge sections that are formed along an intersecting ridgeline portion between the peripheral side surface and each of the first end surface and the second end surface, each of the cutting edge sections comprising:
      a first corner cutting edge disposed at a corner portion;
      a major cutting edge connected with one end of the first corner cutting edge; and
      a minor cutting edge connected with the other end of the first corner cutting edge, wherein at least two cutting edge sections and a seating surface are formed on each of the first end surface and the second end surface, each seating surface is closer to a median plane located midway between the first and second end surfaces than the cutting edge sections, each of the cutting edge sections has a rake face on an adjacent end surface, a non-cutting intersecting ridgeline area extending between adjacent cutting edge sections on either one of the first end surface and the second end surface is located adjacent, via the peripheral side surface, to at least a part of a portion including the corner cutting edge and the major cutting edge of an associating cutting edge section on the other one of the first end surface and the second end surface;

each minor cutting edge extends continuously from the first corner cutting edge to an adjacent second corner cutting edge different from the first corner cutting edge;

each non-cutting intersecting ridgeline area is spaced apart from all four corners of its associated end surface and from said adjacent second corner cutting edge, each non-cutting intersecting ridgeline area extends along a first major side surface portion for less than one-half a length thereof, and each non-cutting intersecting ridgeline area is coplanar with the seating surface of its associated end surface.

10. A cutting insert comprising:

two opposite end surfaces including a first end surface and a second end surface, each of them having an outline with a substantially polygonal shape;

a peripheral side surface that extends between the first end surface and the second end surface; and a plurality of cutting edge sections that are formed along an intersecting ridgeline portion between the peripheral side surface and each of the first end surface and the second end surface, each of the cutting edge sections comprising:

a corner cutting edge disposed at a corner portion;

a major cutting edge connected with one end of the corner cutting edge; and a minor cutting edge connected with the other end of the corner cutting edge, wherein at least two cutting edge sections and a seating surface are formed on each of the first end surface and the second end surface, each of the cutting edge sections has a rake face on an adjacent end surface, at least a part of each of the cutting edge sections at least protrudes in an insert thickness direction, a non-cutting intersecting ridgeline area extending between adjacent cutting edge sections on either one of the first end surface and the second end surface is located adjacent, via the peripheral side surface, to at least a part of a portion including the corner cutting edge and the major cutting edge of an associating cutting edge section on the other one of the first end surface and the second end surface, each cutting edge section further comprises a second corner cutting edge different from the corner cutting edge and connected with the minor cutting edge, and the non-cutting intersecting ridgeline area on either one of the first end surface and the second end surface is located adjacent, in the insert thickness direction, only to a part of the major cutting edge of the cutting edge section on the other one of the first end surface and the second end surface.

* * * * *